(12) United States Patent
Halcrow et al.

(10) Patent No.: US 10,164,955 B1
(45) Date of Patent: Dec. 25, 2018

(54) VOLATILE ENCRYPTION KEYS

(71) Applicant: Google Inc., Mountain View, CA (US)

(72) Inventors: Michael Halcrow, Kirkland, WA (US); Timothy Dierks, Brooklyn, NY (US)

(73) Assignee: Google LLC, Mountain View, CA (US)

(*) Notice: Subject to any disclaimer, the term of this patent is extended or adjusted under 35 U.S.C. 154(b) by 190 days.

(21) Appl. No.: 15/163,716

(22) Filed: May 25, 2016

(51) Int. Cl.
H04L 29/00 (2006.01)
H04L 29/06 (2006.01)
G06F 3/06 (2006.01)

(52) U.S. Cl.
CPC ............ *H04L 63/067* (2013.01); *G06F 3/067* (2013.01); *G06F 3/0622* (2013.01); *G06F 3/0653* (2013.01); *H04L 2463/061* (2013.01)

(58) Field of Classification Search
CPC .. G06F 21/62; G06F 21/6209; G06F 21/6218; G06F 3/0622; G06F 3/0653; G06F 3/067; H04L 63/0428; H04L 63/067
See application file for complete search history.

(56) References Cited

U.S. PATENT DOCUMENTS

| | | | |
|---|---|---|---|
| 6,678,828 B1 | 1/2004 | Pham et al. | |
| 6,931,530 B2 | 8/2005 | Pham et al. | |
| 7,334,124 B2 | 2/2008 | Pham et al. | |
| 8,010,810 B1 | 8/2011 | Fitzgerald et al. | |
| 8,516,271 B2 | 8/2013 | Faraboschi et al. | |
| 8,874,896 B2 | 10/2014 | Boccon-Gibod et al. | |
| 9,231,923 B1 | 1/2016 | Cignetti et al. | |
| 9,235,714 B1 | 1/2016 | Cignetti et al. | |
| 9,680,808 B2* | 6/2017 | Cignetti | H04L 63/061 |
| 2011/0314271 A1 | 12/2011 | Boccon-Gibod et al. | |
| 2015/0089244 A1 | 3/2015 | Roth et al. | |
| 2015/0244523 A1 | 8/2015 | Boccon-Gibod et al. | |
| 2016/0105429 A1* | 4/2016 | Boenisch | H04L 63/0853 713/171 |
| 2016/0112387 A1* | 4/2016 | Cignetti | H04L 63/0428 713/171 |

* cited by examiner

*Primary Examiner* — Brandon S Hoffman
*Assistant Examiner* — Helai Salehi
(74) *Attorney, Agent, or Firm* — Honigman Miller Schwartz and Cohn LLP

(57) ABSTRACT

A method of operating a distributed storage system includes receiving, at data processing hardware of the distributed storage system, a customer-supplied encryption key from a customer device (i.e., a client). The customer-supplied encryption key is associated with wrapped persistent encryption keys for encrypted resources of the distributed storage system. The wrapped persistent encryption keys are stored on one or more non-volatile memory hosts of the distributed storage system. The method also includes unwrapping, by the data processing hardware, a wrapped persistent encryption key that corresponds to a requested encrypted resource using the customer-supplied encryption key. The unwrapped persistent encryption key is configured to decrypt the requested encrypted resource. The method further includes decrypting, by the data processing hardware, the requested encrypted resource using the corresponding unwrapped persistent encryption key. After ceasing access of the decrypted resource, the method includes destroying, by the data processing hardware, the customer-supplied encryption key.

26 Claims, 14 Drawing Sheets

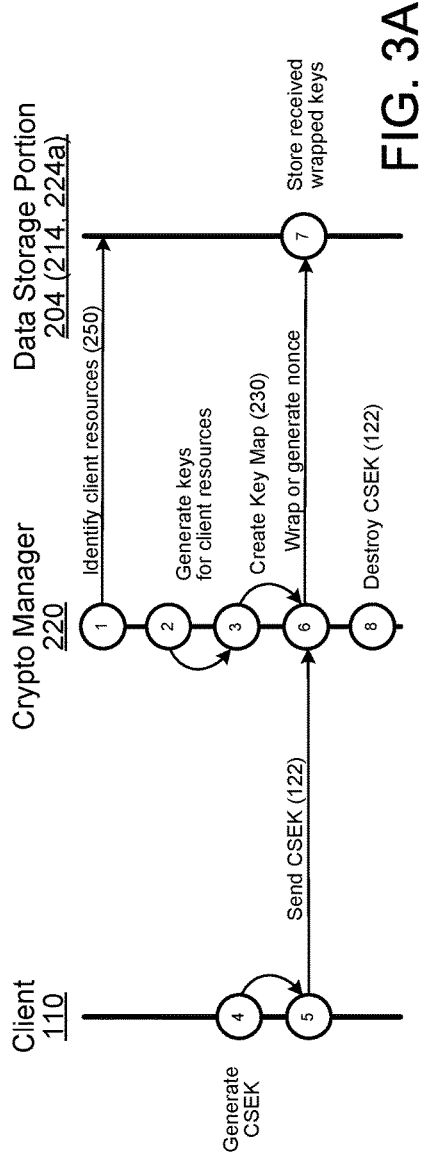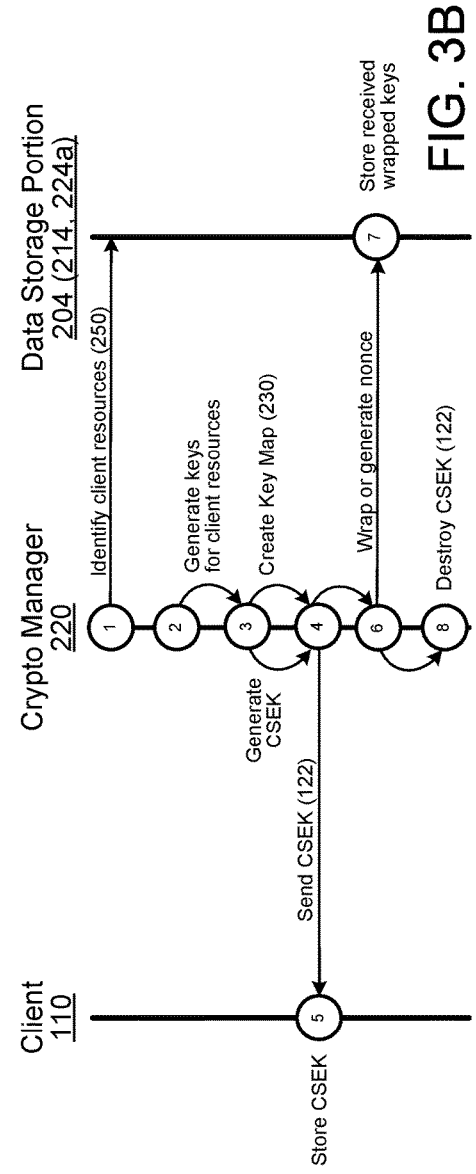

VOLATILE ENCRYPTION KEYS

TECHNICAL FIELD

This disclosure relates to volatile encryption keys associated with clients for accessing client data on a distributed storage system.

BACKGROUND

A distributed system generally includes many loosely coupled computers, each of which typically includes a computing resource (e.g., one or more processors) and/or storage resources (e.g., memory, flash memory, and/or disks). In the distributed storage system, a server process running on one computer may export that computer's storage resources to client processes running on other computers. A client appreciates that his/her data stored on the storage resources remains explicitly under the client's control. Therefore, many storage systems encrypt the client's data using an encryption key to ensure that the client's data is secure and only retrievable by the client. However, storage systems may be exposed to a data breach, and if the encryption key used for encrypting the client data is also stored on the storage resources, then a hacker may be able to access the client's data. Therefore, it is desirable to design storage resources that are capable of protecting client's data stored on the storage resources even when the data is compromised.

SUMMARY

One aspect of the disclosure provides a distributed storage system that includes clients, data processing hardware, and memory hardware in communication with the data processing hardware and the clients. The memory hardware stores instructions that when executed on the data processing hardware cause the data processing hardware to perform a method. In some examples, the method includes receiving, at the data processing hardware (e.g., a cryptographic manager executing on the data processing hardware) of the distributed storage system, a customer-supplied encryption key from a customer device (i.e., a client). The customer-supplied encryption key is associated with wrapped persistent encryption keys for encrypted resources of the distributed storage system. The wrapped persistent encryption keys are stored on one or more non-volatile memory hosts of the distributed storage system. The method also includes unwrapping, by the data processing hardware, a wrapped persistent encryption key that corresponds to a requested encrypted resource using the customer-supplied encryption key. The unwrapped persistent encryption key is configured to decrypt the requested encrypted resource. The method further includes decrypting, by the data processing hardware, the requested encrypted resource using the corresponding unwrapped persistent encryption key. After ceasing access of the decrypted resource, the method includes destroying, by the data processing hardware, the customer-supplied encryption key.

Implementations of the disclosure may include one or more of the following optional features. In some implementations, the customer-supplied encryption key is stored only on volatile memory hardware of one or more memory hosts of the distributed system. The method may include identifying the wrapped persistent encryption key using a key map that maps the wrapped persistent encryption key for the encrypted resources of the distributed system to customer-supplied encryption keys. The key map may include tuples, where each tuple includes a key identifier identifying a customer-supplied encryption key, and a resource identifier identifying an encrypted resource and the wrapped persistent encryption key for the encrypted resource. In some examples, the key map is stored on non-volatile memory hardware of the one or more memory hosts of the distributed storage system.

The method may include receiving, at the data processing hardware, a client request for access to the requested encrypted resource of the distributed system. The client request may include the customer-supplied encryption key and a resource identifier for the requested encrypted resource. In some examples, the method also includes obtaining metadata associated with the requested encrypted resource using the resource identifier. The metadata may include the wrapped persistent encryption key for the requested encrypted resource. In some implementations, the method includes determining, by the data processing hardware, whether the customer-supplied encryption key of the client request is the customer-supplied encryption key identified by a key identifier obtained from the metadata associated with the requested encrypted resource. When the customer-supplied encryption key of the client request is the customer-supplied encryption key identified by the key identifier, the method includes unwrapping, by the data processing hardware, the wrapped persistent encryption key for the requested encrypted resource using the customer-supplied encryption key of the client request. In some examples, determining whether the customer-supplied encryption key of the client request is the customer-supplied encryption key identified by the key identifier includes determining whether a hash of the customer-supplied encryption key of the client request equals the key identifier. In some examples, the requested encrypted resource includes a secure container of a secure container system.

Another aspect of the disclosure provides a distributed storage system that includes clients, data processing hardware, and memory hardware in communication with the data processing hardware and the clients. The memory hardware stores instructions that when executed on the data processing hardware cause the data processing hardware to perform a method. The method includes receiving, at the data processing hardware (e.g., at a cryptographic manager executing on the data processing hardware), a client request for access to an encrypted resource of a distributed system. The client request includes a customer-supplied encryption key. The method also includes obtaining by the data processing hardware, a key identifier that identifies the customer-supplied encryption key associated with the encrypted resource. The method further includes determining, by the data processing hardware, whether the customer-supplied encryption key of the client request is the customer-supplied encryption key identified by the key identifier. When the customer-supplied encryption key of the client request is the customer-supplied encryption key identified by the key identifier, the method includes unwrapping, by the data processing hardware, a wrapped persistent encryption key associated with the requested encrypted resource using the customer-supplied encryption key. The unwrapped persistent encryption key is configured to decrypt the requested encrypted resource.

Implementations of the disclosure may include one or more of the following optional features. In some implementations, the method further includes obtaining, by the data processing hardware, the key identifier that identifies the customer-supplied encryption key from metadata associated with the encrypted resource. In some examples, determining, by the data processing hardware, whether the customer-supplied encryption key of the client request is the customer-supplied encryption key identified by the key identifier at block includes determining whether a hash of the customer-supplied encryption key of the client request equals the key identifier.

The method may further include identifying, by the data processing hardware, the wrapped persistent encryption key using a key map mapping wrapped persistent encryption keys for encrypted resources of the distributed system to customer-supplied encryption keys. The key map may include tuples, where each tuple includes a key identifier identifying a customer-supplied encryption key, and a resource identifier identifying an encrypted resource and the wrapped persistent encryption key for the encrypted resource. In some examples, the method further includes obtaining, by the data processing hardware, the key identifier that identifies the customer-supplied encryption key from the key map. The key map may be stored in non-volatile memory hardware of one or more memory hosts of the distributed system, and the customer-supplied encryption key of the client request is only stored on volatile memory hardware of one or more memory hosts of the distributed system.

In some examples, the method includes decrypting, by the data processing hardware, the requested encrypted resource using the unwrapped persistent encryption key. The method also includes deleting the unwrapped persistent encryption key and the customer-supplied encryption key after receiving an event notification indicating a termination of access to the decrypted resource. The method may also include storing the unwrapped persistent encryption key only on volatile memory hardware of one or more memory hosts of the distributed system. In some examples, the requested encrypted resource includes a secure container of a secure container system.

Yet another aspect of the disclosure provides a distributed storage system that includes clients, data processing hardware, and memory hardware in communication with the data processing hardware and the clients. The memory hardware stores instructions that when executed on the data processing hardware cause the data processing hardware to perform a method. The method includes receiving, at the data processing hardware (e.g., a cryptographic manager executing on the data processing hardware), a key map mapping persistent encryption keys for encrypted resources of a distributed system. The persistent encryption keys are stored wrapped (e.g., wrapped persistent encryption key) in a wrapper on non-volatile memory hardware of one or more memory hosts of the distributed system. The method also includes storing by the data processing hardware, the key map on the non-volatile memory hardware of the one or more memory hosts of the distributed system. The method further includes receiving, at the data processing hardware, a customer-supplied encryption key from a customer device (e.g., a client). The customer-supplied encryption key is associated with the wrapped persistent encryption keys for the encrypted resources. The method also includes storing the customer-supplied encryption key only on the volatile memory hardware of the one or more memory hosts of the distributed system.

Implementations of the disclosure may include one or more of the following optional features. In some implementations, the method further includes unwrapping, by the data processing hardware, the wrapped persistent encryption key from the wrapper using the customer-supplied encryption key. The method may also include accessing, by the data processing hardware, at least one encrypted resource using at least one unwrapped persistent encryption key. In some examples, the method includes storing the unwrapped persistent encryption keys only on volatile memory hardware of the one or more memory hosts of the distributed system. The method may include deleting the unwrapped persistent encryption keys from the volatile memory hardware of the one or more memory hosts of the distributed system after receiving an event notification indicating a termination of access to the at least one encrypted resources.

The method may further include receiving, at the data processing hardware, a volatile cryptographic token from the customer device, and unwrapping, by the data processing hardware, the wrapped persistent encryption keys using the volatile cryptographic token. The method may include combining, by the data processing hardware, the volatile cryptographic token and the customer-supplied encryption key using a key derivation function to derive a persistent encryption key. The method may also include unwrapping, by the data processing hardware, the wrapped persistent encryption key for the at least one encrypted resource using the persistent encryption key. The method may further include deleting the volatile cryptographic token after unwrapping the wrapper.

In some implementations, the method includes creating, by the data processing hardware, the persistent encryption keys for the encrypted resources of the distributed system, and enumerating, by the data processing hardware, the persistent encryption keys. The method may further include wrapping, by the data processing hardware, the persistent encryption keys (e.g., into wrapped persistent encryption key). The encrypted resources may include encrypted data stored on the non-volatile memory hardware of the one or more memory hosts of the distributed system.

Yet another aspect of the disclosure provides a distributed storage system including clients, data processing hardware, and memory hardware in communication with the data processing hardware and the clients. The memory hardware stores instructions that when executed on the data processing hardware cause the data processing hardware to perform a method. The method includes receiving, at the data processing hardware (e.g., at a cryptographic manager executing on the data processing hardware), a customer-supplied encryption key from a customer device (e.g., a client). The customer-supplied encryption key is associated with encrypted resources of a distributed system. While the nonce does not necessarily need to be encrypted, the method also includes decrypting, by the data processing hardware, a nonce for at least one encrypted resource. The method further includes combining, by the data processing hardware, the nonce and the customer-supplied encryption key using a key derivation function to derive a persistent encryption key for the at least one encrypted resource. The method also includes decrypting, by the data processing hardware, the at least one encrypted resource using the persistent encryption key.

Implementations of the disclosure may include one or more of the following optional features. In some implementations, the method includes identifying, by the data processing hardware, the nonce using a key map mapping nonces for encrypted resources of the distributed system to customer-supplied encryption keys. The key map may include tuples, where each tuple includes a key identifier identifying a customer-supplied encryption key, and a resource identifier identifying an encrypted resource and the nonce for the encrypted resource.

In some examples, decrypting the nonce includes decrypting metadata associated with the at least one encrypted resource. The metadata contains the nonce for the at least one encrypted resource. After ceasing access of the at least one decrypted resource, the method includes destroying, by the data processing hardware, the customer-supplied encryption key and the derived encryption key. In some examples, the nonce includes a volatile cryptographic token. The method may include storing the customer-supplied encryption key only on volatile memory hardware of the one or more memory hosts of the distributed system.

In some examples, the method includes obtaining, by the data processing hardware, a key identifier that identifies the customer-supplied encryption key associated with the encrypted resource and determining whether the customer-supplied encryption key of the client request is the customer-supplied encryption key identified by the key identifier. When the customer-supplied encryption key of the client request is the customer-supplied encryption key identified by the key identifier, the method includes combining, by the data processing hardware, the nonce and the customer-supplied encryption key using the key derivation function to derive the persistent encryption key for the at least one encrypted resource. In some examples, determining whether the customer-supplied encryption key of the client request is the customer-supplied encryption key identified by the key identifier includes determining whether a hash of the customer-supplied encryption key of the client request equals the key identifier. The method may further include deleting the derived persistent encryption key after receiving an event notification indicating a termination of access to the decrypted resource.

Another aspect of the disclosure provides a distributed storage system that includes clients, data processing hardware, and memory hardware in communication with the data processing hardware and the clients. The memory hardware stores instructions that when executed on the data processing hardware cause the data processing hardware to perform a method. The method includes receiving, at data processing hardware (e.g., a cryptographic manager executing on a data processing hardware), a client request for access to an encrypted resource of a distributed system. The client request includes a customer-supplied encryption key. The method also includes obtaining, by the data processing hardware, a key identifier that identifies the customer-supplied encryption key associated with the encrypted resource. The method also includes determining, by the data processing hardware, whether the customer-supplied encryption key of the client request is the customer-supplied encryption key identified by the key identifier. When the customer-supplied encryption key of the client request is the customer-supplied encryption key identified by the key identifier, the method includes obtaining, at the data processing hardware, a nonce for the at least one encrypted resource. In addition, when the customer-supplied encryption key of the client request is the customer-supplied encryption key identified by the key identifier, the method includes combining, by the data processing hardware, the nonce and the customer-supplied encryption key using a key derivation function to derive a persistent encryption key for the at least one encrypted resource. The persistent encryption key is configured to decrypt the requested encrypted resource.

Implementations of the disclosure may include one or more of the following optional features. In some implementations, the method further includes obtaining, by the data processing hardware, the key identifier that identifies the customer-supplied encryption key from metadata associated with the encrypted resource. The method may further include obtaining, by the data processing hardware, the nonce from the metadata associated with the encrypted resource. Determining whether the customer-supplied encryption key of the client request is the customer-supplied encryption key identified by the key identifier includes determining whether a hash of the customer-supplied encryption key of the client request equals the key identifier.

In some examples, the method further includes identifying, by the data processing hardware, the requested encrypted resource using a key map that maps encrypted resources of the distributed system to customer-supplied encryption keys. The key map may include tuples, where each tuple includes a key identifier identifying a customer-supplied encryption key and a resource identifier identifying an encrypted resource of the distributed system. In some examples, the method further includes obtaining, by the data processing hardware, the key identifier that identifies the customer-supplied encryption key from the key map. The key map may be stored on non-volatile memory hardware of the one or more memory hosts of the distributed system, and the customer-supplied encryption key of the client request is only stored on volatile memory hardware of the one or more memory hosts of the distributed system.

In some implementations, the method includes decrypting, by the data processing hardware, the requested encrypted resource using the persistent encryption key. The method may also include deleting the persistent encryption key and the customer-supplied encryption key after receiving an event notification indicating a termination of access to the decrypted resource. In some examples, the method includes storing the persistent encryption key only on volatile memory hardware of the one or more memory hosts of the distributed system.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3A is a schematic view of an exemplary arrangement of operations for generating a customer-supplied encryption key by the client.

FIG. 3B is a schematic view of an exemplary arrangement of operations for generating a customer-supplied encryption key by the cryptographic manager.

Like reference symbols in the various drawings indicate like elements.

DETAILED DESCRIPTION

Distributed systems generally include a network of data centers that each house computer systems and their associated components, such as telecommunications and storage systems. In some implementations, clients use distributed systems to store their data. Most clients want to ensure that their data is secured and cannot be retrieved by anyone besides the client even when a data breach at the data center occurs. Therefore, it is desirable to design a distributed system that stores client data and is impenetrable by unauthorized users (e.g., hackers) preventing the client data from being accessed by the unauthorized users.

In some implementations, the distributed system persists a hierarchy of wrapped keys that map to resources of the distributed system. The keys are wrapped with one or more higher-level customer-supplied wrapping keys, referred to as customer-supplied encryption keys. To access a resource associated with the customer, the customer need only provide a higher-level key in the hierarchy, i.e., a customer-supplied encryption key. In some implementations, customer supplies a nonce used to derive the customer-supplied encryption key. The distributed system never persists the customer-supplied encryption key in non-volatile memory and only stores the customer-supplied encryption key in volatile memory. Moreover, the distributed system only stores the customer-supplied encryption key as long as needed to read wrapped keys underneath it into memory and unwrap them using the wrapping key, i.e., the customer-supplied encryption key. At that point, the distributed system erases the customer-supplied encryption key from the volatile memory. After the distributed system completes customer-requested operations that use the lower unwrapped keys, the distributed system erases the lower unwrapped keys in the hierarchy of keys.

Figure 1A:
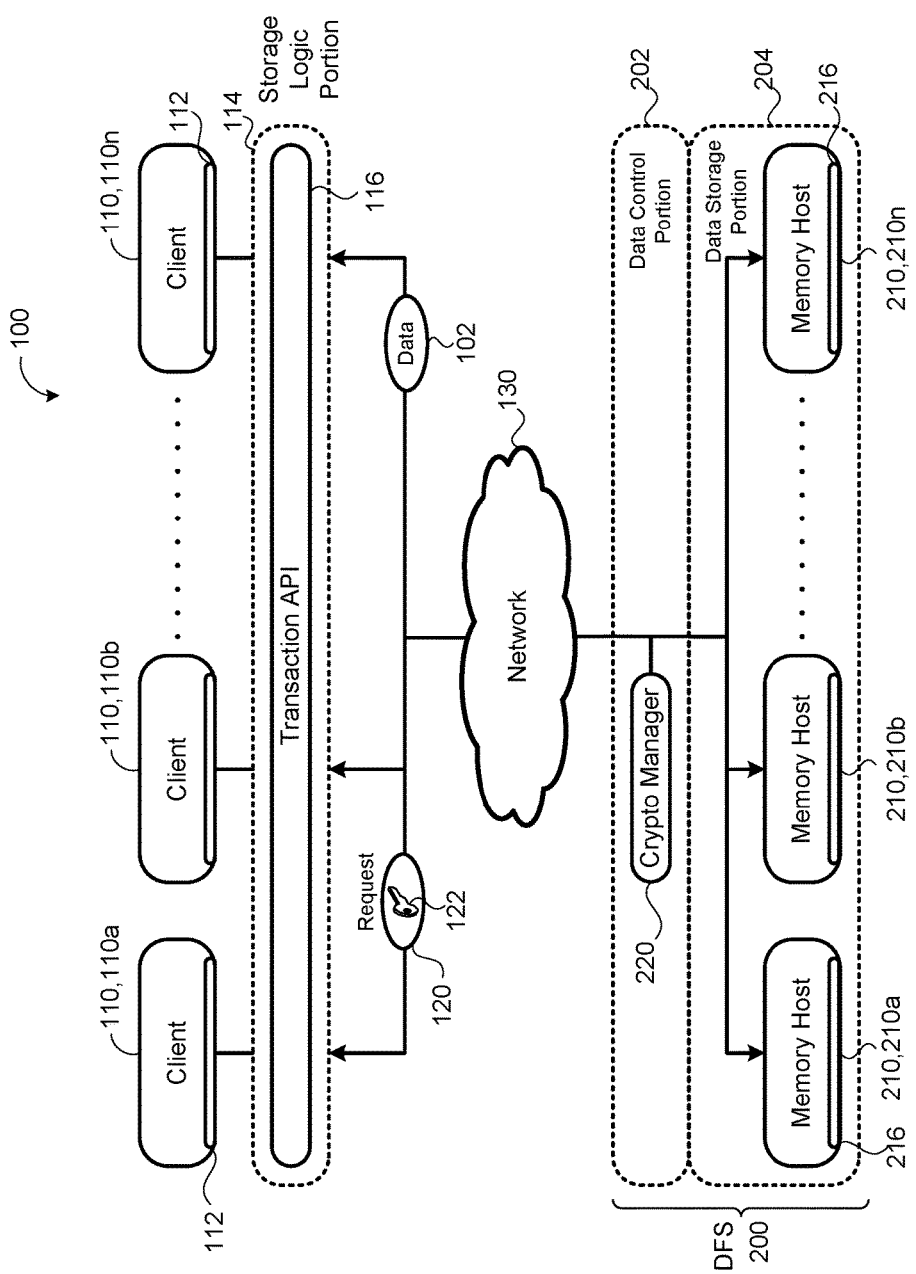
FIG. 1A is a schematic view of an exemplary distributed storage system.
Figure 1B:
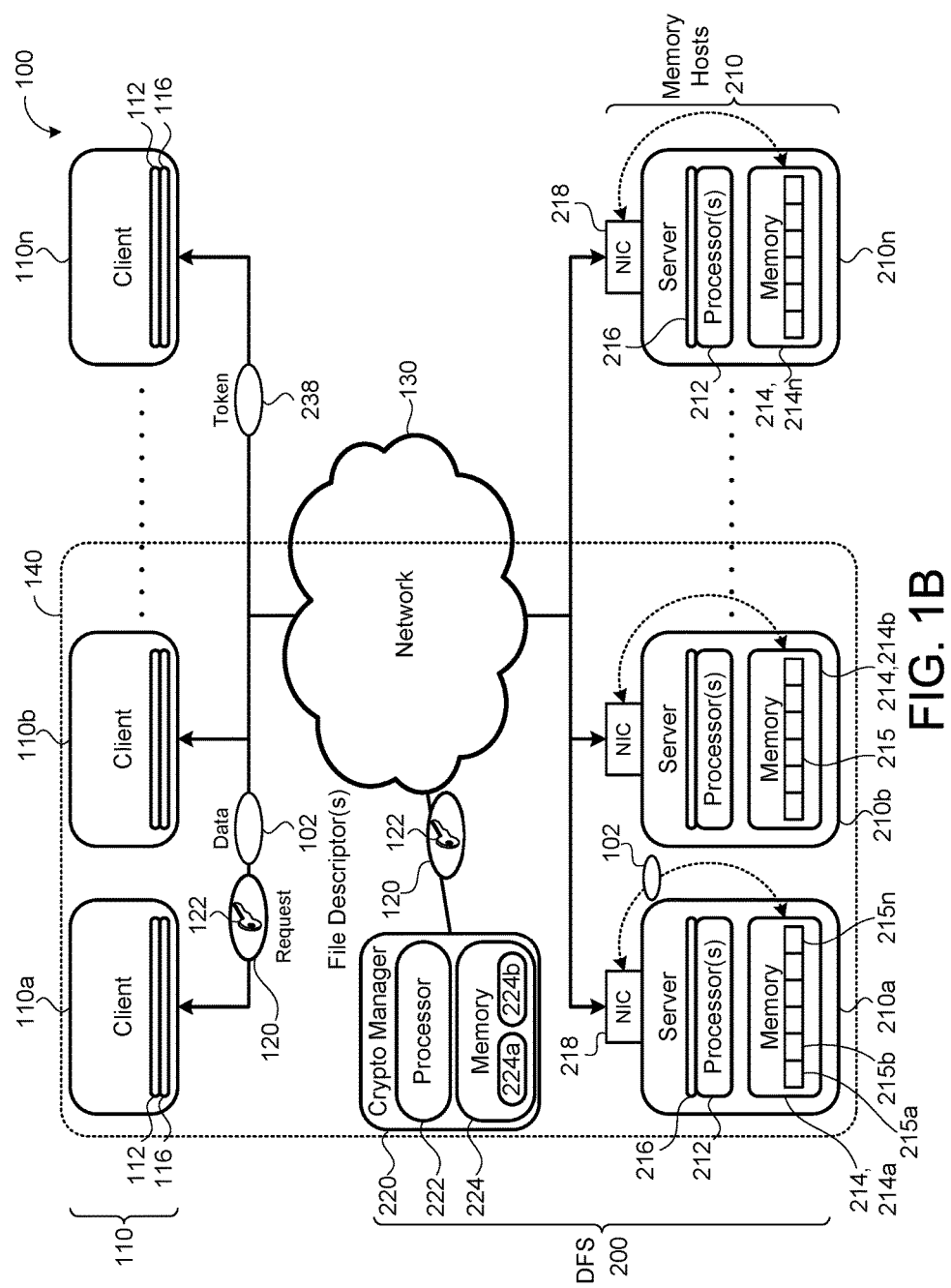
FIG. 1B is a schematic view of an exemplary distributed storage system having a cell of memory hosts managed by a cryptographic manager.

Referring to FIGS. 1A and 1B, in some implementations, a distributed storage system 100 includes clients 110, 110a-n in communication with a distributed file system (DFS) 200 via a network 130. The clients 110 may store data 102 on the DFS 200 and retrieve the stored data 102 at a later time. The DFS 200 includes loosely coupled memory hosts 210, 210a-n (e.g., computers or servers), each having a computing resource 212 (e.g., one or more processors or central processing units (CPUs)) in communication with storage resources 214 (e.g., memory, flash memory, non-volatile memory, dynamic random access memory (DRAM), phase change memory (PCM), and/or disks) that may be used for storing or caching data. A storage abstraction (e.g., key/value store or file system) overlain on the storage resources 214 allows scalable use of the storage resources 214 by one or more clients 110, 110a-n. The clients 110 may communicate with the memory hosts 210 through the network 130 (e.g., via RPC). The DFS 200 also includes a cryptographic manager 220 configured to manage the data 102 stored on the DFS 200.

In some implementations, the distributed storage system 100 is "single-sided," eliminating the need for any server jobs for responding to remote procedure calls (RPC) from clients 110 to store or retrieve data 102 on their corresponding memory hosts 210 and may rely on specialized hardware to process remote requests 120 (e.g., from clients 110) instead. "Single-sided" refers to the method by which most of the request processing on the memory hosts 210 may be done in hardware rather than by software executed on CPUs 212 of the memory hosts 210. Rather than having a processor 212 of a memory host 210 (e.g., a server) execute a server process 216 that exports access of the corresponding storage resource 214 (e.g., non-transitory memory) to client processes 112 executing on the clients 110, the clients 110 may directly access the storage resource 214 through a network interface controller (NIC) 218 of the memory host 210. In other words, a client process 112 executing on a client 110 may directly interface with one or more storage resources 214 without requiring execution of a routine of any server processes 216 executing on the computing resources 212. This single-sided distributed storage architecture offers relatively high-throughput and low latency, since clients 110 can access the storage resources 214 without interfacing with the computing resources 212 of the memory hosts 210. This has the effect of decoupling the requirements for storage 214 and CPU 212 cycles that typical two-sided distributed storage systems 100 carry. The single-sided distributed storage system 100 may utilize remote storage resources 214 regardless of whether there are spare CPU 212 cycles on that memory host 210. Furthermore, since single-sided operations do not contend for server CPU 212 resources, a single-sided system 100 may serve cache requests with very predictable, low latency, even when memory hosts 210 are running at high CPU 212 utilization. Thus, the single-sided distributed storage system 100 allows higher utilization of both cluster storage 214 and CPU resources 212 than traditional two-sided systems, while delivering predictable, low latency.

In some implementations, the distributed storage system 100 includes a storage logic portion 114, a data control portion 202, and a data storage portion 204. The storage logic portion 114 may include a transaction application programming interface (API) 116 (e.g., a single-sided transactional system client library) that is responsible for accessing the underlying data, for example, via RPC or single-sided operations. The data control portion 202 may manage allocation and access to storage resources 214 with tasks, such as allocating storage resources 214, registering storage resources 214 with the corresponding network interface controller 218, setting up connections between the client(s) 110 and the memory hosts 210, handling errors in case of machine failures, etc. The data storage portion 204 may include the loosely coupled memory hosts 210, 210a-n.

The distributed storage system 100 may store data 102 in dynamic random access memory (DRAM) 214 and serve the data 102 from the remote hosts 210 via remote direct memory access (RDMA)-capable network interface controllers 218. The network interface controller 218 (also known as a network interface card, network adapter, or LAN adapter) may be a computer hardware component that connects a computing resource 212 to the network 130. Both the memory hosts 210a-n and the client 110 may each have a network interface controller 218 for network communications. The host process 216 executing on the computing processor 212 of the memory host 210 registers a set of remote direct memory accessible regions 215a-n of the memory 214 with the network interface controller 218. The host process 216 may register the remote direct memory accessible regions 215a-n of the memory 214 with a permission of read-only or read/write. The single-sided operations performed by the network interface controllers 218 may be limited to simple reads, writes, and compare-and-swap operations, none of which may be sophisticated enough to act as a drop-in replacement for the software logic implemented by a traditional cache server job to carry out cache requests and manage cache policies. The transaction API 116 translates commands, such as look-up or insert data commands, into sequences of primitive network interface controller operations. The transaction API 116 interfaces with the data control and data storage portions 202, 204 of the DFS 200.

The DFS 200 may include a co-located software process to register memory 214 for remote access with the network interface controllers 218 and set up connections with client processes 112. Once the connections are set up, client processes 112 may access the registered memory 214 via engines in the hardware of the network interface controllers 218 without any involvement from software on the local CPUs 212 of the corresponding memory hosts 210.

In some implementations, the transaction API 116 interfaces between a client 110 (e.g., with the client process 112) and the cryptographic manager 220. In some examples, the client 110 communicates with the cryptographic manager 220 through one or more remote procedure calls (RPC). In response to a client request 120, the transaction API 116 may find the storage location of certain data 102 on the memory host(s) 210 and obtain a key 122 that allows access to the data 102. The transaction API 116 communicates directly with the appropriate memory hosts 210 (via the network interface controllers 218) to read or write the data 102 (e.g., using remote direct memory access). In the case that a memory host 210 is non-operational, or the data 102 was moved to a different memory host 210, the client request 120 fails, prompting the client 110 to re-query the cryptographic manager 220.

Referring to FIG. 1B, in some implementations, the distributed storage system 100 includes multiple cells 140, each cell 140 including memory hosts 210 and a cryptographic manager 220 in communication with the memory hosts 210. The cryptographic manager 220 (e.g., process) may execute on a computing processor 222 in communication with non-transitory memory 224 that includes non-volatile memory 224a and volatile memory 224b. The non-transitory memory 224 may be the same or separate from the storage resources 214. The cryptographic manager 220 is connected to the network 130 and manages data storage (e.g., manage a file system stored on the memory hosts 210), control data placements, and/or initiate data recovery. Moreover, the cryptographic manager 220 may track an existence and storage location of data 102 on the memory hosts 210. Redundant cryptographic managers 220 are possible. In some implementations, the cryptographic manager(s) track the allocation of data 102 across multiple memory hosts 210 and the existence and/or location of multiple copies of the data 102 for redundancy and/or performance. Additionally, the cryptographic manager 220 manages the storage and retrieval of client data 102 stored in the memory resources 214 of the DFS 200. For example, if a client 110 wants to retrieve data 102 that the client 110 previously stored on the memory resources 214 of the DFS 200, the client 110 may send the cryptographic manager 220 a client request 120 that includes a customer-supplied encryption key 122. The cryptographic manager 220 receives the customer-supplied encryption key 122 and based on the customer-supplied encryption key 122, retrieves the data 102 stored in the memory resources 214 corresponding to the client request 120.

Figure 2A:
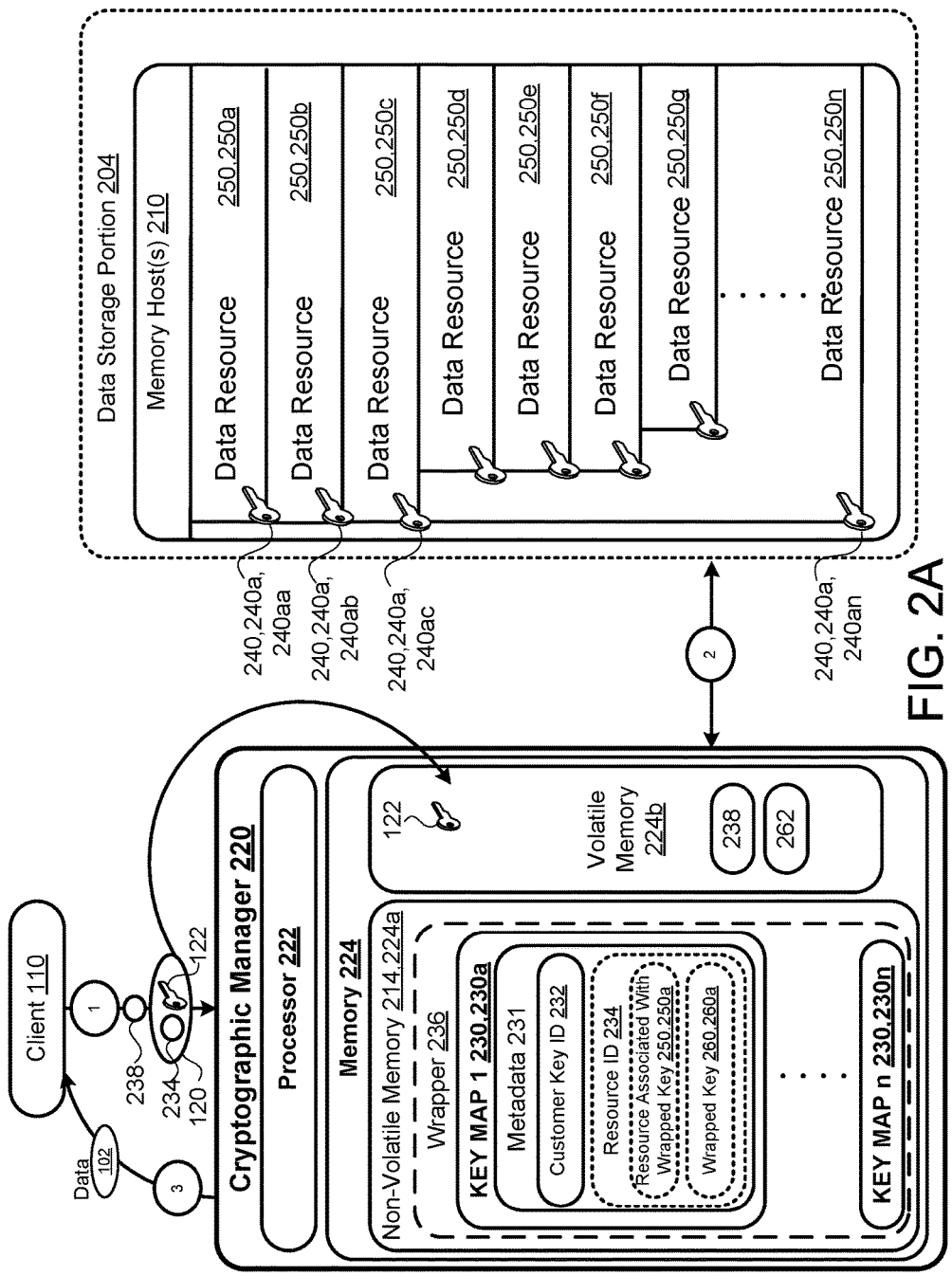
FIGS. 2A and 2B are schematic views of an exemplary cryptographic manager managing a data storage portion of the distributed storage system.
Figure 2B:
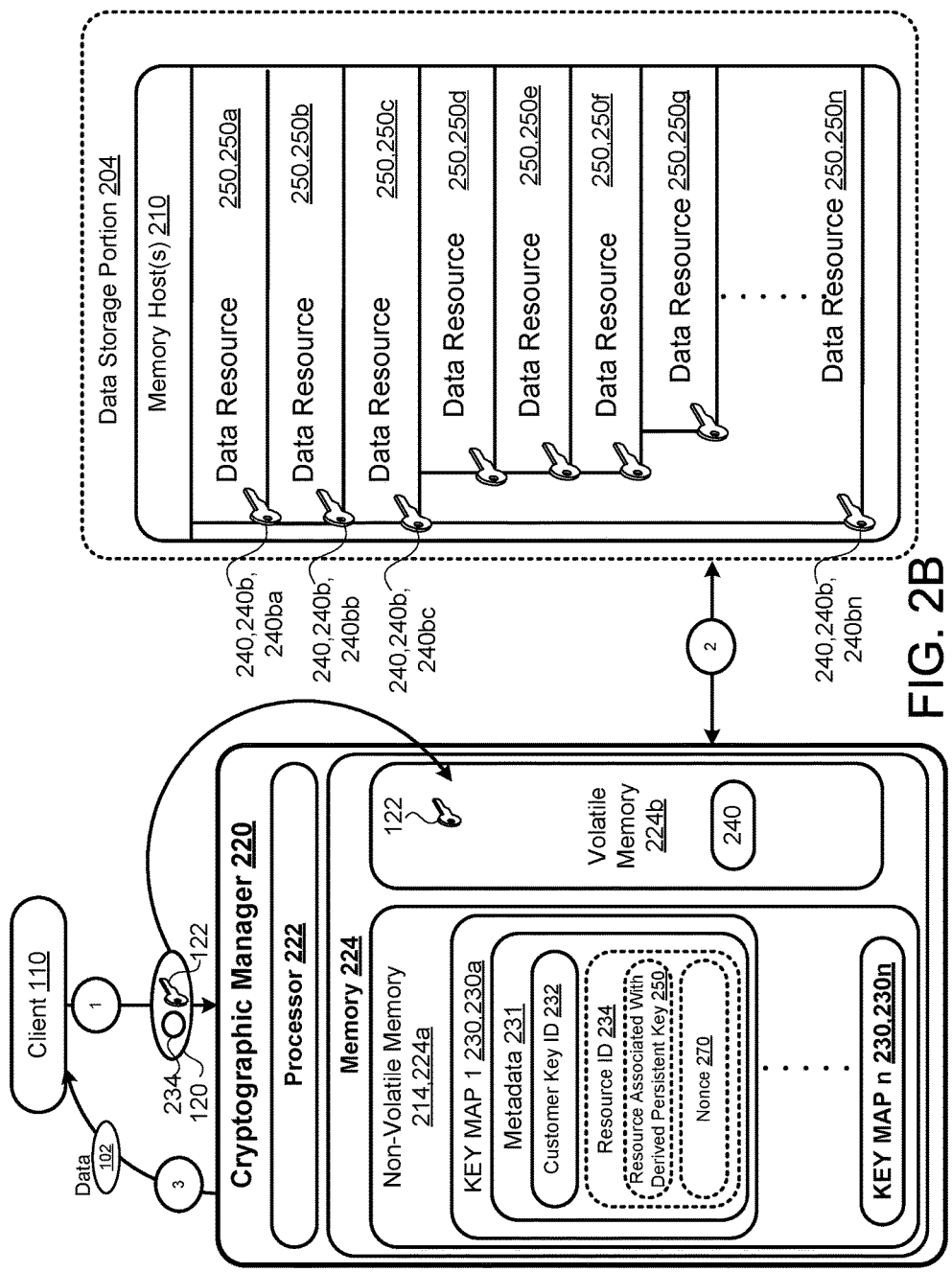

Referring also to FIGS. 2A and 2B, the distributed storage system 100 provides the client(s) 110 with secure data storage and minimizes or prevents unauthorized client(s) 110 from accessing the stored data 102. Therefore, the distributed storage system 100 limits its access to data 102 stored on the memory resources 214 to instances where the client 110 sends the DFS 200 (e.g., the cryptographic manager 220) a data request 120 that includes a customer-supplied encryption key 122. The customer-supplied encryption key 122 may be thought of as a master key that opens a key map 230 that includes data resources 214 (stored on the memory resources 214) and their associated resource persistent keys 240. The key map 230 may be stored on non-volatile memory 224a associated with the cryptographic manager 220, while the customer-supplied encryption key 122 is temporarily stored on the volatile memory 224b associated with the cryptographic manager 220, for example, until the operation associated with the client request 120 is complete. As such, the cryptographic manager 220 deletes the customer-supplied encryption key 122 from the volatile memory 224b after retrieving the data 102, which prevents unauthorized clients/users from accessing the data 102. Since the DFS 200 does not maintain the customer-supplied encryption key 122, access to the data 102 is not compromised even when the DFS 200 experiences a data breach.

Referring to FIG. 2A, the cryptographic manager 220 manages the storage and retrieval of client data 102 stored in the memory resources 214 of the DFS 200. In some examples, the cryptographic manager 220 generates a persistent key 240 associated with each client resource 250 (e.g., memory resource 114) storing the client data 102. The cryptographic manager 220 key wraps the generated persistent keys 240 into wrapped persistent keys 260 associated with the customer-supplied encryption key 122. Key wrapping constructions are a class of symmetric encryption algorithms designed to encapsulate or encrypt cryptographic key material. Key wrap algorithms may be used and are intended for applications that protect keys while in untrusted storage for example, or while transmitting keys via untrusted communication networks. Once the cryptographic manager 220 wraps the persistent keys 240, the cryptographic manager 220 has to unwrap the wrapped persistent keys 240 into unwrapped persistent keys 240a, 240aa-240an using the customer-supplied encryption key 122 before accessing the requested resources 250. Thus, the client 110 maintains one customer-supplied encryption key 122 associated with the individual wrapped persistent keys 260. The cryptographic manager 220 uses the customer-supplied encryption key 122 to un-wrap the wrapped persistent keys 260 into the individual unwrapped persistent keys 240a, 240aa-240an, where each unwrapped persistent key 240a, 240aa-240an is associated with a requested resource 250. The cryptographic manager 220 discards the customer-supplied encryption key 122 after using the customer-supplied encryption key 122 to unwrap the wrapped persistent keys 260. The persistent keys 240a, 260 (e.g., wrapped or unwrapped) may only be accessed by way of the customer-supplied encryption key 122. In some examples, the cryptographic manager 220 wraps the unwrapped persistent keys 240a, 240aa-240an into a key hierarchy. In this case, the key map 230 may include metadata 231 associated with the encrypted resources 250. The metadata 231 may include a wrapped persistent encryption key(s) 260 associated with the client encrypted resource 250, 250a-n and a key identifier 232. Thus, the key map 230 maps the wrapped persistent encryption key 260, 260a-n for the encrypted resources 250, 250-n of the distributed system 100 to customer-supplied encryption keys 122.

Referring to FIG. 2B, in additional examples, the cryptographic manager 220 derives the persistent keys 240b, 240ba-240bn from the customer-supplied encryption key 122 based on a key derivation function (KDF) using a nonce 270. In this example, the metadata 231 includes the nonce 270 that the cryptographic manager 220 uses to derive the persistent encryption key 240b, 240ba-240bn associated with a requested client data resource 250. Therefore, by using a KDF and a nonce 270, the cryptographic manager 220 does not store wrapped persistent keys 260 used to retrieve unwrapped persistent keys 240 (i.e., persistent keys), instead the cryptographic manager 220 uses the nonce 270 in addition to the customer-supplied encryption key 122 to determine the derived persistent key 240b, 240ba-240bn. In some examples, the KDF is a Hash-Bases Message Authentication Code (HMAC) based Extract-and-Expand Key Derivation Function (HKDF). HKDF follows the extract-then-expand paradigm, where the KDF includes two stages. The first stage takes the input keying material and extracts from it a fixed-length pseudorandom key. The second stage expands the pseudorandom key into several additional pseudorandom keys, which are the output of the HKDF.

In yet another example (not shown), upon a client request 120, the cryptographic manager 220 sends the client 110 the wrapped persistent keys 260 so that the client 110 un-wraps the wrapped persistent keys 260 into unwrapped keys 240a using the customer-supplied encryption key 122. Then the client 110 sends the unwrapped persistent keys 240a associated with the requested data 102 to the cryptographic manager 220. Once the cryptographic manager 220 receives the unwrapped persistent keys 240a, then the cryptographic manager 220 retrieves the data 102 associated with the requested client data resources 250. In this instance, the DFS 200 fails to have possession of the customer-supplied encryption key 122. Other examples may be used to cryptographically allow the persistent keys 240, 260 to be accessed only when the client 110 provides an associated customer-supplied encryption key 122. The access of the DFS 200 to the requested client resource 250 expires when the customer-supplied encryption key 122 is deleted from the volatile memory 224b.

Referring again to FIGS. 1A-2B, in some examples, before retrieving the data 102 associated with the memory resources 214 requested by the client 110, the cryptographic manager 220 determines if the received customer-supplied encryption key 122 is the key 122 associated with the client 110 and/or the memory resources 214 storing the client data 102. For example, the cryptographic manager 220 compares a hash of the customer-supplied encryption key 122 with the customer key identifier 232 stored in the metadata 231 associated with the requested resource 250. A hash is a scheme for providing rapid access to data items, which are distinguished by a key, i.e., the key identifier 232. Each data item or encrypted resource 250, 250a-n that is stored, is associated with the key identifier 232. A hash function is applied to the key identifier 232 and the resulting hash value is used as an index to select one of a number of "hash buckets" in a hash table. The table contains pointers to the original items. In some examples, the hash is a SHA-2 (Secure Hash Algorithm 2) having a digest size of 224, 256, 384 or 512 bits. The SHA-2 is a set of cryptographic hash function designed by the National Security Agency (NSA).

In some implementations, the cryptographic manager 220 is configured to retrieve an audit log that includes instances when data 102 associated with a client 110 has been retrieved. The audit log is a security-level chronological record, set of records, and/or destination and source of records that provide documentary evidence of the sequence of activities that have affected at any time a specific operation, procedure, or event. In this case, the audit log includes a chronological record of access to the data 102 associated with a client 110. In some examples, the cryptographic manager 220 may send the client 110 e audit log(s), or the client 110 may have access to the audit log(s).

FIGS. 3A and 3B illustrate exemplary operations of generating the customer-supplied encryption key 122 within the distributed storage system 100 as shown in FIGS. 2A and 2B. In some examples, at step 1, the cryptographic manager 220 identifies one or more client data resources 250 associated with a client 110. At step 2, the cryptographic manager 220 generates a persistent key 240, 240a, 240b associated with each one of the identified resource 250, 250a-n. Once the cryptographic manager 220 associates the persistent keys 240, 240a, 240b with the identified resource 250, 250a-n, the cryptographic manager 220 creates a key map 230 for the identified resources 250 of the client 110 at step 3. In some examples, the cryptographic manager 220 persists the key map 230 on its non-volatile memory 224a. Referring to FIG. 3A, in some examples, at step 4, the client 110 generates the customer-supplied encryption key 122 (also referred to as CSEK), and at step 5, the client 110 sends the customer-supplied encryption key 122 to the cryptographic manager 220. Referring to FIG. 3B, in additional examples, at step 3, in addition to creating the key map 230, the cryptographic manager 220 generates the customer-supplied encryption key 122. With continued reference to FIG. 3B, at step 4, the cryptographic manager 220 sends customer-supplied encryption key 122 to the client 110, which in turn stores the customer-supplied encryption key 122. Referring back to both FIGS. 3A and 3B, once the customer-supplied encryption key 122 and the key map 230 are generated, at step 6, the cryptographic manager 220 wraps all the persistent keys 240 into wrapped persistent keys 260 associated with the customer-supplied encryption key 122, or the cryptographic manager 220 generates a nonce 270 associated with each persistent key 240. At step 7, the data storage portion 204, stores the wrapped keys 260 (FIG. 2A) or the nonces 270 (FIG. 2B). Finally, at step 8, the cryptographic manager 220 destroys the customer-supplied encryption key 122.

Figure 4:
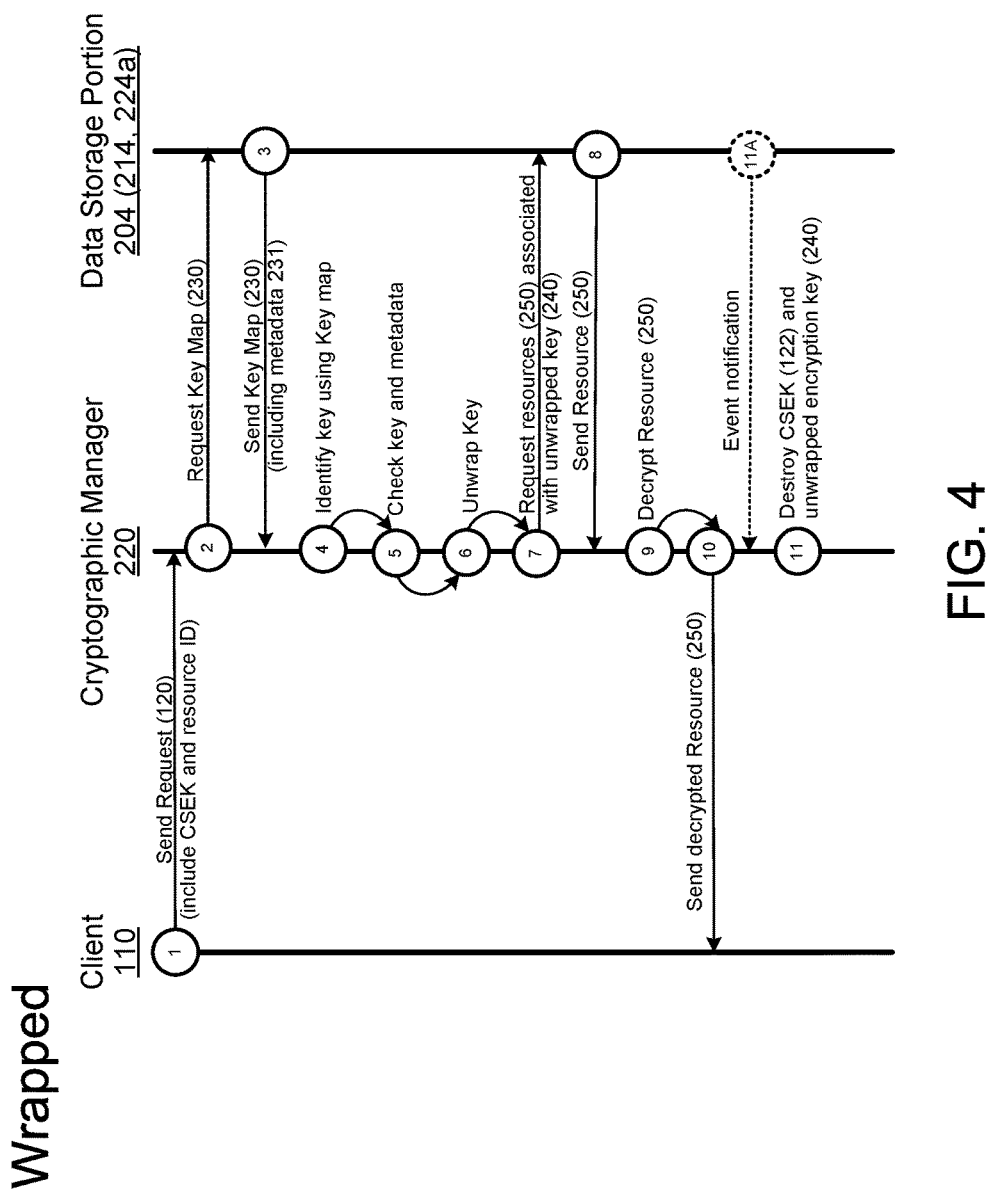
FIG. 4 is a schematic view of an exemplary arrangement of operations for retrieving a secured resource using a previously generated customer-supplied encryption key.

FIGS. 2A and 4 illustrate an example where the cryptographic manager 220 unwraps a wrapped encryption key 260 using a customer-supplied derived persistent encryption key 262. In some implementations, at step 1, the client 110 sends a client request 120 for access to encrypted resource 250, 250a-n stored on the data storage portion 204 (e.g., the storage resources 214, 224a (e.g., non-volatile)) of the distributed system 100. The client request 120 may include a customer-supplied encryption key 122 and a resource identifier 234 identifying the requested encrypted resource 250, 250a-n. The cryptographic manager 220 receives the client request 120, and at step 2, sends the data storage portion 204 a request for a key map 230 that identifies wrapped persistent encryption keys 260 associated with the requested resources 250 of the client request 120. In some examples, the wrapped persistent encryption keys 260 are wrapped in a wrapper 236. The key map 230 includes metadata 231 associated with the requested encrypted resource 250 identified by the resource identifier 234 from the client request 120. The metadata 231 includes a key identifier 232 identifying the customer-supplied encryption key 122 and a wrapped persistent encryption key 260 for the requested encrypted resource 250, 250a-n. Thus, the key map 230 maps the wrapped persistent encryption key 260, 260a-n for the encrypted resources 250 of the distributed system 100 to customer-supplied encryption keys 122. At step 3, the data storage portion 204 sends the key map 230 to the cryptographic manager 220. At step 4, the cryptographic manager 220 identifies the wrapped persistent encryption key 260, 260a-n using the received key map 230. Therefore, the cryptographic manager 220 uses the key map 230 to identify the wrapped persistent encryption key 260, 260a-n associated with the requested resource 250. The key map 230 may include tuples, where each tuple includes the key identifier 232 identifying a customer-supplied encryption key 122, and the resource identifier 234 identifying an encrypted resource 250, 250a-n and the wrapped persistent encryption key 260, 260a-n for the encrypted resource 250, 250a-n. In some examples, the client 110 stores the key map 230. In such a case, the client request 120 that the client 110 sends to the cryptographic manager 220 includes the key map 230 as well as the customer-supplied encryption key 122.

At step 5, the cryptographic manager 220 determines or checks if the customer-supplied encryption key 122 included in the client request 120 is the customer-supplied encryption key 122 identified by the key identifier 232 obtained from the metadata 231. In some examples, step 5 includes the cryptographic manager 220 determining if a hash of the customer-supplied encryption key 122 of the client request 120 equals the key identifier 232. The key identifier 232 may be a hash of the customer-supplied encryption key 122.

At step 6, if the customer-supplied encryption key 122 of the client request 120 is the customer-supplied encryption key 122 identified by the key identifier 232, the cryptographic manager 220 unwraps the wrapped persistent encryption key 260, 260a-n for the requested encrypted resource 250, 250a-n using the customer-supplied encryption key 122 of the client request 120. The wrapped persistent encryption key 260, 260a-n is unwrapped into an unwrapped persistent encryption key 240, 240a, 240aa-an. The unwrapped persistent encryption key 240, 240a, 240aa-an is configured to decrypt the requested encrypted resource 250, 250a-n.

At step 7, the cryptographic manager 220 requests the encrypted resources 250 associated with the unwrapped keys 240, 240a, 240aa-an. At step 8, the data storage portion 204 sends the requested encrypted resources 250 to the cryptographic manager 220. At step 9, the cryptographic manager 220 decrypts the requested encrypted resource 250, 250a-n using the corresponding unwrapped persistent encryption key 240, 240a, 240aa-an. Once the resource 250, 250a-n is decrypted, the cryptographic manager 220 sends the decrypted resource 250, 250a-n to the client 110 at step 10. Finally, at step 11, the cryptographic manager 220 destroys the customer-supplied encryption key 122 from volatile memory hosts 214, 224b (e.g., volatile memory hardware of memory hosts) preventing the client 110 or anyone else from accessing the encrypted resource 250, 250a-n without receiving another request 120 from the client 110 that includes the customer-supplied encryption key 122. In addition, the cryptographic manager 220 deletes the unwrapped persistent key 240, 240a, 240aa-an from volatile memory hosts 224b. In some examples, the cryptographic manager 220 deletes the customer-supplied encryption key 122 and/or the unwrapped persistent key 240, 240a, 240aa-an from volatile memory hosts 224b after receiving an event notification from the data storage portion 204 indicating a termination of access to the resources 250.

Figure 5:
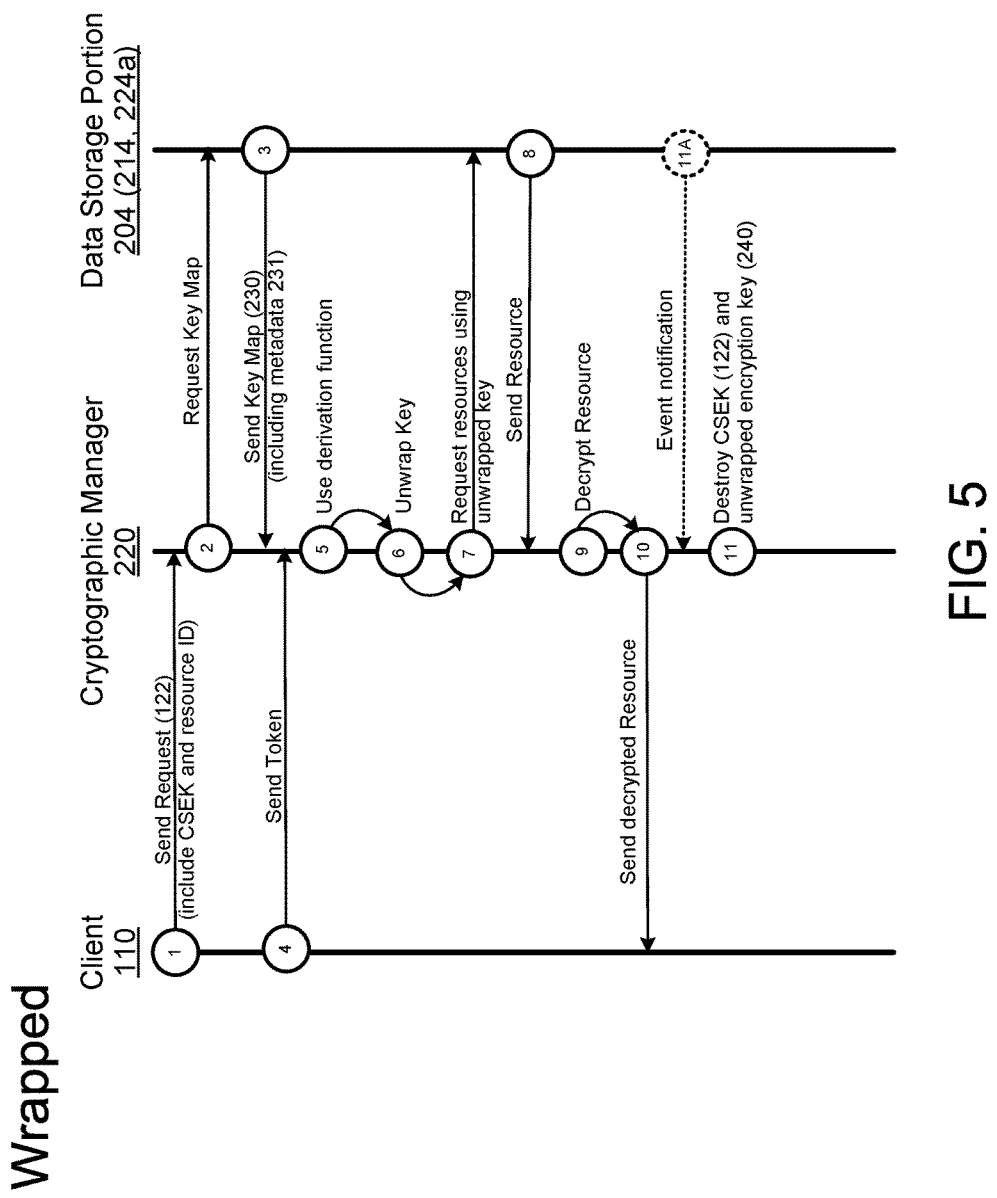
FIG. 5 is a schematic view of an exemplary arrangement of operations for retrieving a secured resource using a previously generated customer-supplied encryption key and a derivation function.

FIGS. 2A and 5, illustrate an example where the cryptographic manager 220 generates a customer-supplied derived persistent encryption key 262 (temporarily stored in volatile memory 224b) using the customer-supplied encryption key 122 and a volatile cryptographic token 238 to unwrap the wrapped persistent keys 260. In some implementations, at step 1, the client 110 sends a client request 120 to the cryptographic manager 220 for access to encrypted resource 250, 250a-n stored on the data storage portion 204 (e.g., non-volatile 214, 224a) of the distributed system 100. The client request 120 may include a customer-supplied encryption key 122 and a resource identifier 234 identifying the requested encrypted resource 250, 250a-n. The cryptographic manager 220 stores the customer-supplied encryption key 122 on volatile memory hosts 224b. The cryptographic manager 220 receives the client request 120, and at step 2, sends the data storage portion 204 a request for a key map 230 that identifies wrapped persistent encryption keys 260 associated with the requested resources 250 of the client request 120. In some examples, the wrapped persistent encryption keys 260 are wrapped in a wrapper 236. Therefore, the cryptographic manager 220 may request the wrapper 236 from the data portion 204. The cryptographic manager 220, in some examples, may request the key map 230 from the client 110 instead of the data storage portion 204. In such cases, the client 110 stores both the key map 230 and the customer-supplied encryption key 122. At step 3, the data storage portion 204 (or the client 110) sends the key map 230 to the cryptographic manager 220.

At step 4, the client 110 sends the cryptographic manager 220 the volatile cryptographic token 238 (e.g., a nonce). The volatile cryptographic token 238 may be an arbitrary number that may only be used once. The volatile cryptographic token 238 may be a random or pseudo-random number issued by an authentication protocol to endure that old communications cannot be reused in replay attacks. For example, the volatile cryptographic token 238 may be different, every time the client 110 sends the cryptographic manager 220 a request 120 for data. However, the customer-supplied encryption keys 122 may be the same every time the user sends the request 120. In some examples, the volatile cryptographic token 238 includes a timestamp in its value to ensure that it is only used once.

At step 5, the cryptographic manager 220 combines the volatile cryptographic token 238 and the customer-supplied encryption key 122 using a KDF (e.g., stored on the data storage portion 204) to derive the customer-supplied derived persistent encryption key 262 associated with the requested resource 250. The KDF derives one or more secret keys (e.g., customer-supplied derived persistent encryption key 262) from a secret value, such as a master key or the customer-supplied encryption key 122 using a pseudo-random function (e.g., the volatile cryptographic token 238).

At step 6, the cryptographic manager 220 uses the customer-supplied derived persistent encryption key 262 associated with the requested resource 250 to unwrap the wrapped persistent encryption key 260, 260*a-n* for the requested encrypted resource 250, 250*a-n*. The wrapped persistent encryption key 260, 260*a-n* is unwrapped into an unwrapped persistent encryption key 240, 240*a*, 240*aa-an*. The unwrapped persistent encryption key 240, 240*a*, 240*aa-an* is configured to decrypt the requested encrypted resource 250, 250*a-n*. Steps 7 through 11 of FIG. 5 are the same as the ones described with respect to FIG. 4.

Figure 6:
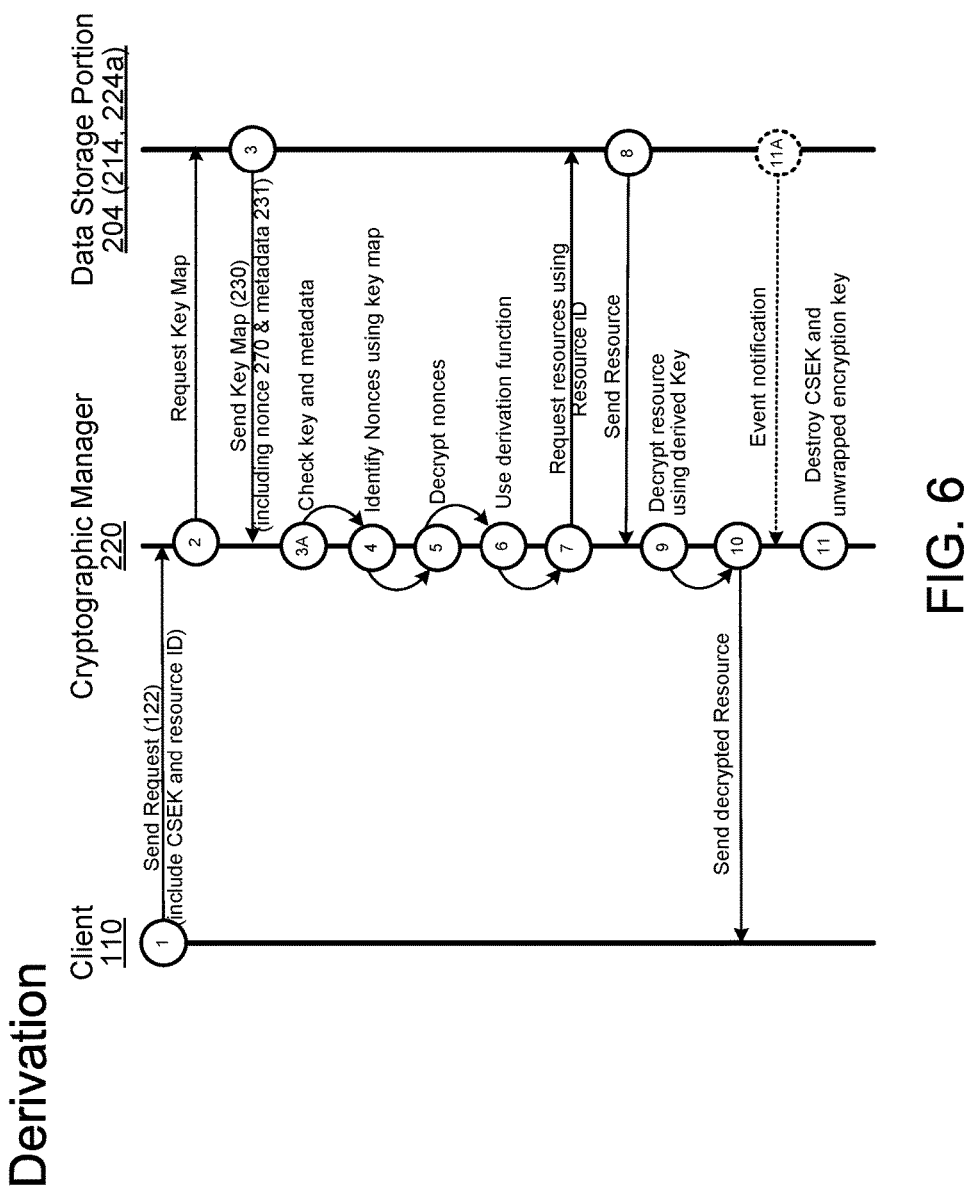
FIG. 6 is a schematic view of an exemplary arrangement of operations for retrieving a secured resource using a previously generated customer-supplied encryption key, a nonce, and a derivation function.

FIGS. 2B and 6 illustrate an example where the cryptographic manager 220 derives a persistent encryption key 240 to decrypt the resources 250 using the customer-supplied encryption key 122 and a nonce 270 associated with the key map 230 and included in the metadata 231. In some implementations, at step 1, the client 110 sends a client request 120 for access to encrypted resource 250, 250*a-n* stored on the data storage portion 204 (e.g., non-volatile) of the distributed system 100. The client request 120 may include a customer-supplied encryption key 122 and a resource identifier 234 identifying the requested encrypted resource 250, 250*a-n*. The cryptographic manager 220 stores the customer-supplied encryption key 122 on volatile memory hosts 224*b*. Once the cryptographic manager 220 receives the client request 120, at step 2, the cryptographic manager 220 sends the data storage portion 204 a request for a key map 230. The key map 230 maps nonces 270 (e.g., volatile cryptographic token) for the encrypted resources 250, 250*a-n* of the distributed system 100 to customer-supplied encryption keys 122. The cryptographic manager 220, in some examples, may request the key map 230 from the client 110 instead of the data storage portion 204. In such cases, the client 110 stores both the key map 230 and the customer-supplied encryption key 122. The key map 230 may include tuples, where each tuple includes a key identifier 232 identifying a customer-supplied encryption key 122 and a resource identifier 234 identifying an encrypted resource 250, 250*a-n* and the nonce 270 for the encrypted resource 250, 250*a-n*.

At step 3, the data storage portion 204 sends the cryptographic manager 220 the requested key map 230. At step 3A, the cryptographic manager 220 determines or checks if the customer-supplied encryption key 122 included in the client request 120 is the customer-supplied encryption key 122 identified by the key identifier 232 obtained from the key map 230. In some examples, at step 3A the cryptographic manager 220 determines if a hash of the customer-supplied encryption key 122 of the client request 120 equals the key identifier 232. The key identifier 232 may be a hash of the customer-supplied encryption key 122.

If the customer-supplied encryption key 122 included in the client request 120 is the customer-supplied encryption key 122 identified by the key identifier 232 obtained from the key map 230, then at step 4, the cryptographic manager 220 identifies the nonces 270 associated with the requested encrypted resource(s) 250, 250*a-n* using the key map 230.

At step 5, the cryptographic manager 220 decrypts the identified nonces 270 (associated with the requested resources 250). For example, the cryptographic manager 220 decrypts metadata 231 associated with at least one encrypted resource 250 and containing the nonce 270 for the at least one encrypted resource 250. In some examples, the metadata 231 is associated with the key map 230.

At step 6, the cryptographic manager 220 combines the identified nonce(s) 270 and the customer-supplied encryption key 122 using a key derivation function (e.g., HKDF) to derive a derived persistent encryption key 240, 240*b*, 240*ba-bn* associated with the requested resource 250.

At step 7, the cryptographic manager 220 requests the encrypted resources 250 associated with the derived persistent encryption key 240, 240*b*, 240*ba-bn* and associated with the resource identifier 234. At step 8, the data storage portion 204 sends the requested encrypted resources 250. At step 9, the cryptographic manager 220 decrypts the requested encrypted resource 250, 250*a-n* using the corresponding derived persistent encryption key 240, 240*b*, 240*ba-bn*. Once the resource 250, 250*a-n* is decrypted, the cryptographic manager 220 sends the decrypted resource 250, 250*a-n* to the client 110 at step 10. Finally, at step 11, the cryptographic manager 220 destroys the customer-supplied encryption key 122 from the volatile memory hosts 224*b* preventing the client 110 or anyone else from accessing the encrypted resource 250, 250*a-n* without receiving (at the cryptographic manager 220) another request 120 from the client 110 that includes the customer-supplied encryption key 122. In addition, the cryptographic manager 220 deletes the derived persistent key 240, 240*b*, 240*ba-bn* from the volatile memory hosts 224*b*. In some examples, the cryptographic manager 220 deletes the customer-supplied encryption key 122 and/or the derived persistent key 240, 240*b*, 240*ba-bn* from the volatile memory hosts 224*b* after receiving an event notification from the data storage portion 204 indicating a termination of access to the resources 250.

Figure 7:
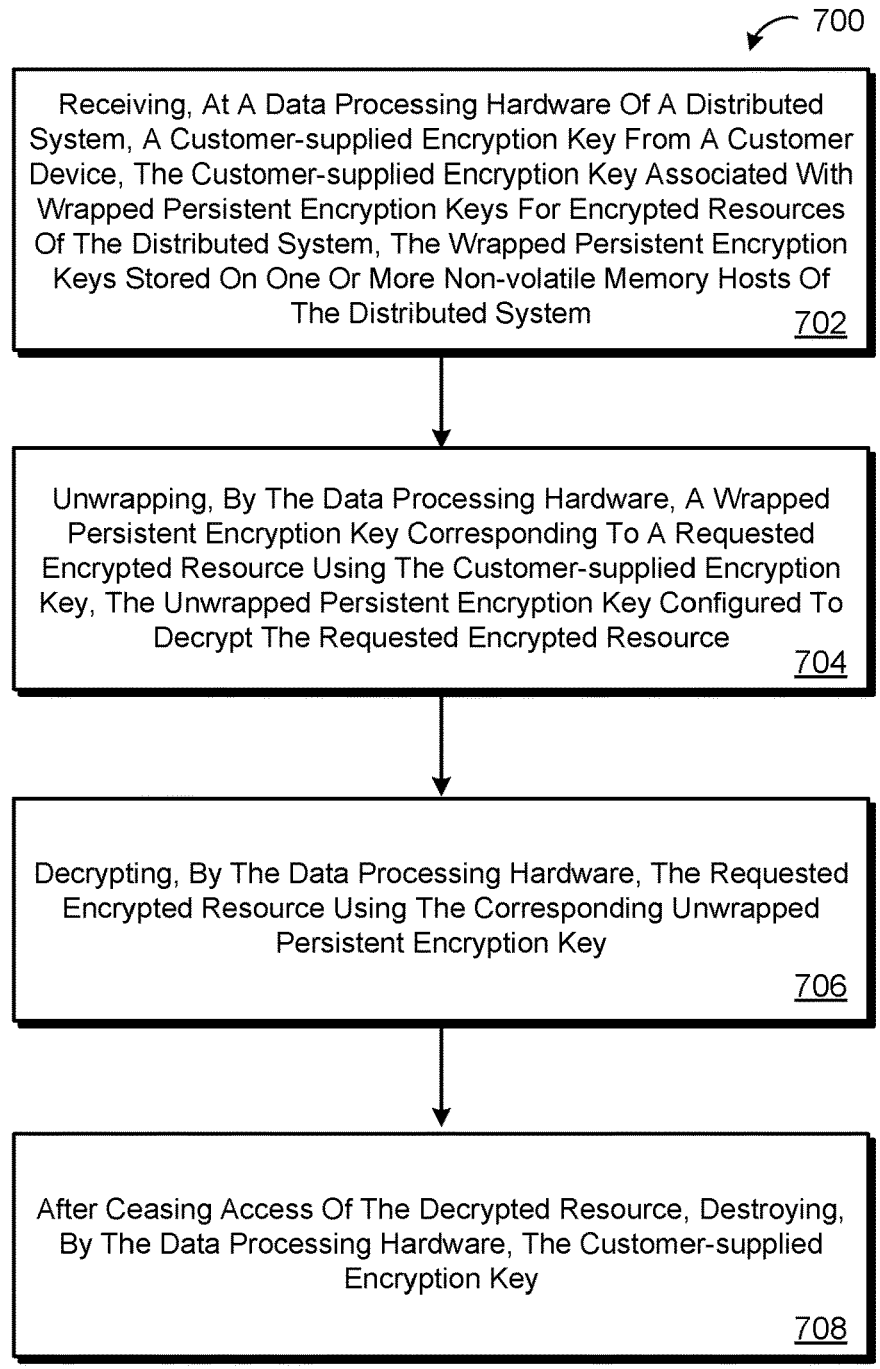
FIG. 7 is a schematic view of an exemplary arrangement of operations for retrieving a secured resource using a previously generated customer-supplied encryption key.

Referring to FIG. 7, in some implementations, a method 700 of operating a distributed storage system 100 includes at block 702, receiving, at a data processing hardware (e.g., a cryptographic manager 220 executing on a data processing hardware 222) of the distributed storage system 100, a customer-supplied encryption key 122 from a customer device (i.e., a client 110). The customer-supplied encryption key 122 is associated with wrapped persistent encryption keys 260, 260*a-n* for encrypted resources 250, 250*a-n* of the distributed storage system 100. The encrypted resources 250, 250*a-n* include stored data 102 associated with the client 110. The wrapped persistent encryption keys 260*a*, 260*a-n* are stored on one or more non-volatile memory hosts 224*a*, 214 (e.g., non-volatile memory hardware of the memory hosts) of the distributed storage system 100. In some examples, the non-volatile memory hosts 224*a*, 214 include one or both of the non-volatile memory 224*a* of the processor 222 associated with the cryptographic manager 220, or the storage resources 214 (e.g., non-volatile or flash memory). In some examples, the customer-supplied encryption key 122 is stored only on one or more volatile memory hosts 224*b* of the distributed system 100.

At block 704, the method 700 includes unwrapping a wrapped persistent encryption key 260, 260*a-n* that corresponds to a requested encrypted resource 250 using the customer-supplied encryption key 122. The wrapped persistent encryption key 260, 260*a-n* is unwrapped into an unwrapped persistent encryption key 240, 240*a-n*. The unwrapped persistent encryption key 240, 240*a*, 240*aa-an* is configured to decrypt the requested encrypted resource 250, 250*a-n*.

At block 706, the method 700 includes decrypting the requested encrypted resource 250, 250*a-n* using the corresponding unwrapped persistent encryption key 240, 240*a*, 240*aa-an*. Finally, at block 708, the method 700 includes destroying the customer-supplied encryption key 122. For example, the cryptographic manager 220 destroys the customer-supplied encryption key 122 from the volatile memory hosts 224*b* preventing the client 110 or anyone else from accessing the encrypted resource 250, 250*a-n* without receiving another request 120 from the client 110 that includes the customer-supplied encryption key 122.

In some implementations, the method 700 includes identifying the wrapped persistent encryption key 260, 260a-n using a key map 230 that maps the wrapped persistent encryption key 260, 260a-n for the encrypted resources of the distributed system to customer-supplied encryption keys 122. The key map 230 may include tuples, where each tuple includes a key identifier 232 identifying a customer-supplied encryption key 122, and a resource identifier 234 identifying an encrypted resource 250, 250a-n and the wrapped persistent encryption key 260, 260a-n for the encrypted resource 250, 250a-n. In some examples, the key map 230 is stored on the one or more non-volatile memory hosts 224a, 214 of the distributed storage system 100. In such a case, the request 120 that the client 110 sends to the cryptographic manager 220 includes the key map 230 as well as the customer-supplied encryption key 122. However, the key map 230 may be stored on non-volatile memory 224a, 214. In this case, the client 110 may only send the customer-supplied encryption key 122 to access the encrypted resource 250, 250a-n.

In some examples, the method 700 includes receiving a client request 120 for access to the requested encrypted resource 250, 250a-n of the distributed system 100. The client request 120 may include the customer-supplied encryption key 122 and a resource identifier 234 for the requested encrypted resource 250, 250a-n. The method 700 may also include obtaining metadata 231 associated with the requested encrypted resource 250, 250a-n using the resource identifier 234. The metadata includes the wrapped persistent encryption key 260 for the requested encrypted resource 250, 250a-n. In some implementations, the method 700 includes determining whether the customer-supplied encryption key 122 of the client request 120 is the customer-supplied encryption key 122 identified by a key identifier 232 obtained from the metadata 231 associated with the requested encrypted resource 250, 250a-n. Therefore, the cryptographic manager 220 checks if the customer-supplied encryption key 122 of the client request 120 is the customer-supplied encryption key 122 identified by a key identifier 232 obtained from the metadata 231 associated with the requested encrypted resource 250, 250a-n. When the customer-supplied encryption key 122 of the client request 120 is the customer-supplied encryption key 122 identified by the key identifier 232, the method 700 includes unwrapping the wrapped persistent encryption key 260, 260a-n for the requested encrypted resource 250, 250a-n using the customer-supplied encryption key 122 of the client request 120. In some examples, determining whether the customer-supplied encryption key 122 of the client request 120 is the customer-supplied encryption key 122 identified by the key identifier 232, includes determining whether a hash of the customer-supplied encryption key 122 of the client request 120 equals the key identifier 232.

In some examples, the requested encrypted resource 250, 250a-n includes a secure container of a secure container system. A secure container is an authenticated and encrypted area of a container system that separates information based on information importance and sensitivity. The container system may include multiple secure containers. The purpose of the secure containers (also referred to as sandboxing) is to prevent malware intruders from interacting with the data associated with the secure containers. For example, the container system may include the use of enclaves, which are protected areas of execution and/or storage.

Figure 8:
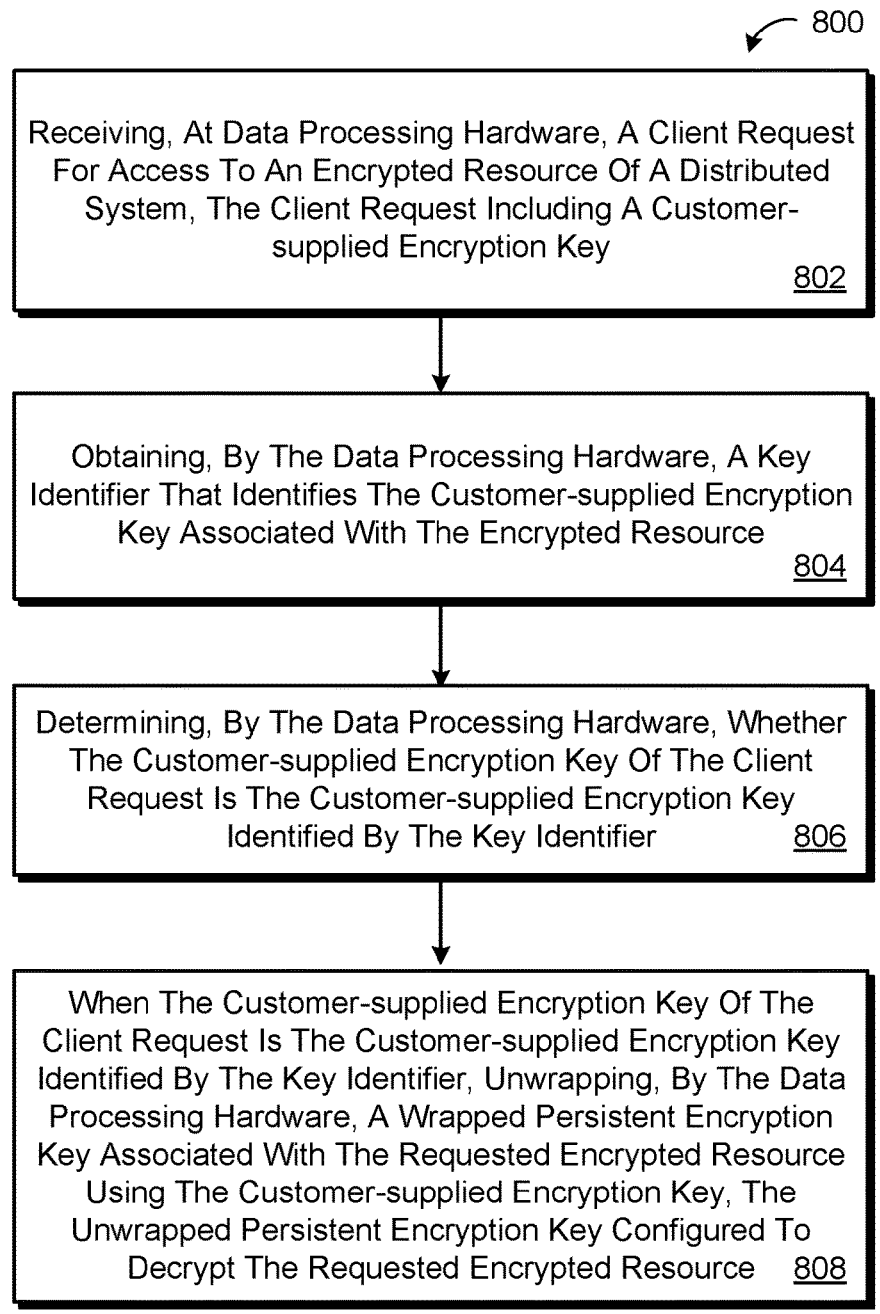
FIG. 8 is a schematic view of an exemplary arrangement of operations for retrieving a secured resource using a previously generated customer-supplied encryption key and verifying that the generated customer-supplied encryption key is one identified by a key identifier.

Referring to FIG. 8, in some implementations, a method 800 of operating a distributed storage system 100 includes at block 802, receiving, at a data processing hardware (e.g., a cryptographic manager 220 executing on a data processing hardware 222), a customer-supplied encryption key 122. At block 804, the method 800 includes obtaining, by the data processing hardware 222, a key identifier 232 that identifies the customer-supplied encryption key 122 associated with the encrypted resource 250, 250a-n. At block 806, the method 800 includes determining, by the data processing hardware 222, whether the customer-supplied encryption key 122 of the client request 120 is the customer-supplied encryption key 122 identified by the key identifier 232. At block 808, when the customer-supplied encryption key 122 of the client request 120 is the customer-supplied encryption key 122 identified by the key identifier 232, the method 800 includes unwrapping, by the data processing hardware 222, a wrapped persistent encryption key 260, 260a-n associated with the requested encrypted resource 250, 250a-n using the customer-supplied encryption key 122. The unwrapped persistent encryption key 240240, 240a, 240aa-an is configured to decrypt the requested encrypted resource 250, 250a-n.

In some implementations, the method 800 further includes obtaining, by the data processing hardware 222, the key identifier 232 that identifies the customer-supplied encryption key 122 from metadata 231 associated with the encrypted resource 250, 250a-n. For example, the key identifier 232 may include metadata 231 that includes the key identifier 232 and a resource identifier 234 that identifies an encrypted resource 250, 250a-n and the wrapped persistent encryption key 260, 260a-n for the encrypted resource 250, 250a-n. In some examples, determining, by the data processing hardware 222, whether the customer-supplied encryption key 122 of the client request 120 is the customer-supplied encryption key 122 identified by the key identifier 232 at block 806, includes determining whether a hash of the customer-supplied encryption key 122 of the client request 120 equals the key identifier 232.

The method 800 may further include identifying, by the data processing hardware 222, the wrapped persistent encryption key 260, 260a-n using a key map mapping wrapped persistent encryption keys 260, 260a-n for encrypted resources 250, 250a-n of the distributed system 100 to customer-supplied encryption keys 122. The key map 230 may include tuples, where each tuple includes a key identifier 232 identifying a customer-supplied encryption key 122, and a resource identifier 234 identifying an encrypted resource 250, 250a-n and the wrapped persistent encryption key 260, 260a-n for the encrypted resource 250, 250a-n. In some examples, the method 800 further includes obtaining, by the data processing hardware 222, the key identifier 232 that identifies the customer-supplied encryption key 122 from the key map 230. The key map 230 may be stored in one or more non-volatile memory hosts 224a, 214 of the distributed system 100, and the customer-supplied encryption key 122 is only stored on one or more volatile memory hosts 224b of the distributed system 100.

In some examples, the method 800 further includes decrypting, by the data processing hardware 222, the requested encrypted resource 250, 250a-n using the unwrapped persistent encryption key 240, 240a, 240aa-an. The method 800 also includes deleting the unwrapped persistent encryption key 240, 240a, 240aa-an and the customer-supplied encryption key 122 after receiving an event notification indicating a termination of access to the decrypted resource 250, 250a-n. The method 800 may also include storing the unwrapped persistent encryption key 240, 240a, 240aa-an only on one or more volatile memory hosts 224b of the distributed system 100.

In some examples, the requested encrypted resource 250, 250a-n includes a secure container of a secure container system. A secure container is an authenticated and encrypted area of a container system that separates information based on information importance and sensitivity. The container system may include multiple secure containers. The purpose of the secure containers (also referred to as sandboxing) is to prevent malware intruders from interacting with the data associated with the secure containers.

Figure 9:
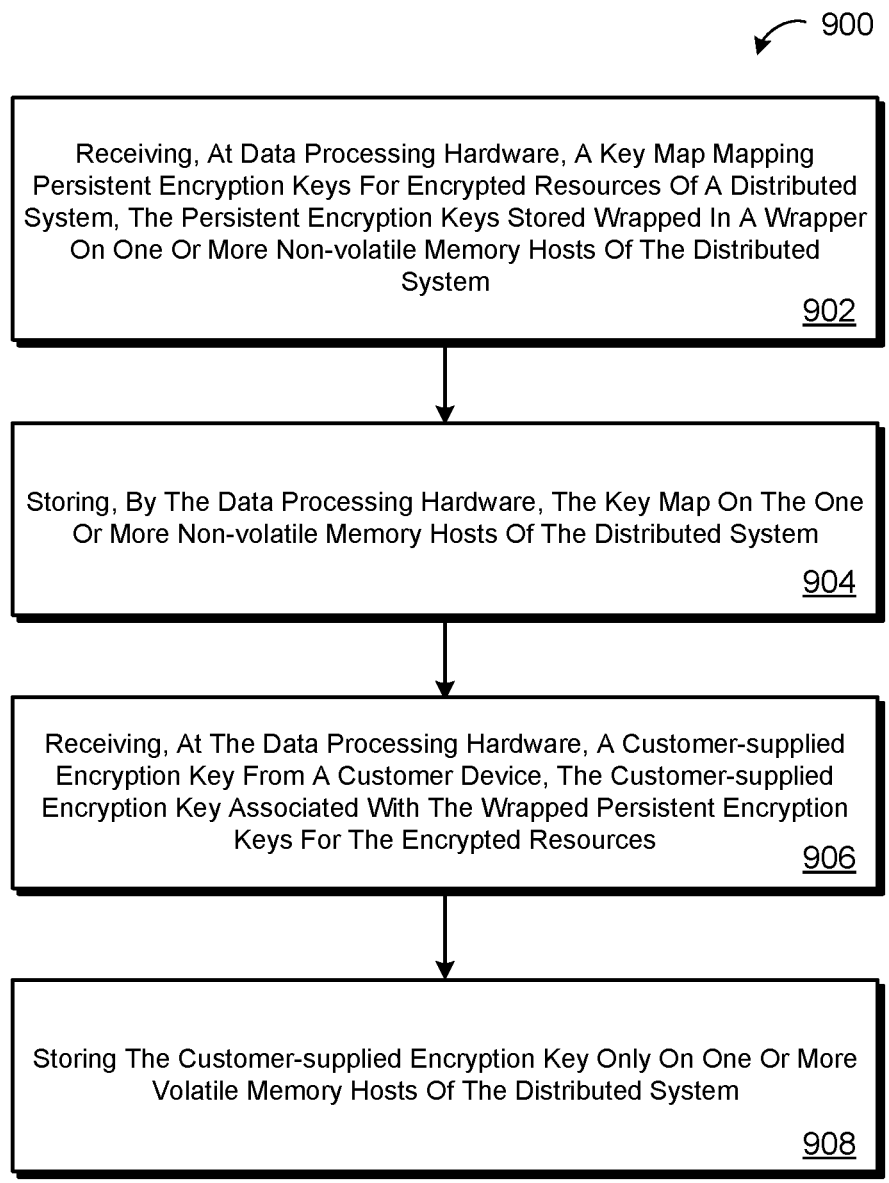
FIG. 9 is a schematic view of an exemplary arrangement of operations for retrieving a secured resource using a previously generated customer-supplied encryption key.

Referring to FIG. 9, in some implementations, a method 900 of operating a distributed storage system 100 includes at block 902, receiving, at a data processing hardware (e.g., a cryptographic manager 220 executing on a data processing hardware 222), a key map 230 mapping persistent encryption keys 240 for encrypted resources 250, 250a-n of a distributed system 100. The persistent encryption keys 240, 240a, 240aa-an (e.g., wrapped persistent encryption key 260) stored wrapped in a wrapper 236 on one or more non-volatile memory hosts 224a, 214 of the distributed system 100. The block 904, the method 900 includes storing by the data processing hardware 222, the key map 230 on the one or more non-volatile memory hosts 224a, 214 of the distributed system 100. At block 906, the method 900 includes receiving, at the data processing hardware 222, a customer-supplied encryption key 122 from a customer device (e.g., a client 110). The customer-supplied encryption key 122 is associated with the wrapped persistent encryption keys 260, 260a-n for the encrypted resources 250, 250a-n. At block 908, the method 900 includes storing the customer-supplied encryption key 122 only on one or more volatile memory hosts 224b of the distributed system 100.

In some implementations, the method 900 further includes unwrapping, by the data processing hardware 222, the wrapped persistent encryption key 260, 260a-n from the wrapper 236 using the customer-supplied encryption key 122. The method 900 may also include accessing, by the data processing hardware 222, at least one encrypted resource 250, 250a-n using at least one unwrapped persistent encryption key 240, 240a, 240aa-an. In some examples, the method 900 includes storing the unwrapped persistent encryption keys 240, 240a, 240aa-an only on the one or more volatile memory hosts 224b of the distributed system 100. The method 900 may include deleting the unwrapped persistent encryption keys 240, 240a, 240aa-an from the one or more volatile memory hosts 224b of the distributed system 100 after receiving an event notification indicating a termination of access to the at least one encrypted resources 250, 250a-n.

The method 900 may further include receiving, at the data processing hardware 222, a volatile cryptographic token 238 from the customer device 110, and unwrapping, by the data processing hardware, the wrapped persistent encryption keys 260, 260a-n using the volatile cryptographic token 238. The method 900 may include combining, by the data processing hardware 222, the volatile cryptographic token 238 and the customer-supplied encryption key 122 using a key derivation function to derive a customer-supplied derived persistent encryption key 262 and unwrapping, by the data processing hardware 222, the wrapped persistent encryption key 260, 260a-n for the at least one encrypted resource 250, 250a-n using the customer-supplied derived persistent encryption key 262. The method 900 may further include deleting the volatile cryptographic token 238 after unwrapping the wrapper 305. The method may also include deleting the customer-supplied derived persistent encryption key 262

In some implementations, the method 900 includes creating, by the data processing hardware 222, the persistent encryption keys 240 for the encrypted resources 250, 250a-n of the distributed system 100, enumerating, by the data processing hardware, the persistent encryption keys 240. The method 900 further includes wrapping, by the data processing hardware 222, the persistent encryption keys 240 (e.g., into wrapped persistent encryption key 260, 260a-n). In some implementations, the encrypted resources 250, 250a-n include encrypted data stored on the one or more non-volatile memory hosts 214 of the distributed system 100.

Figure 10:
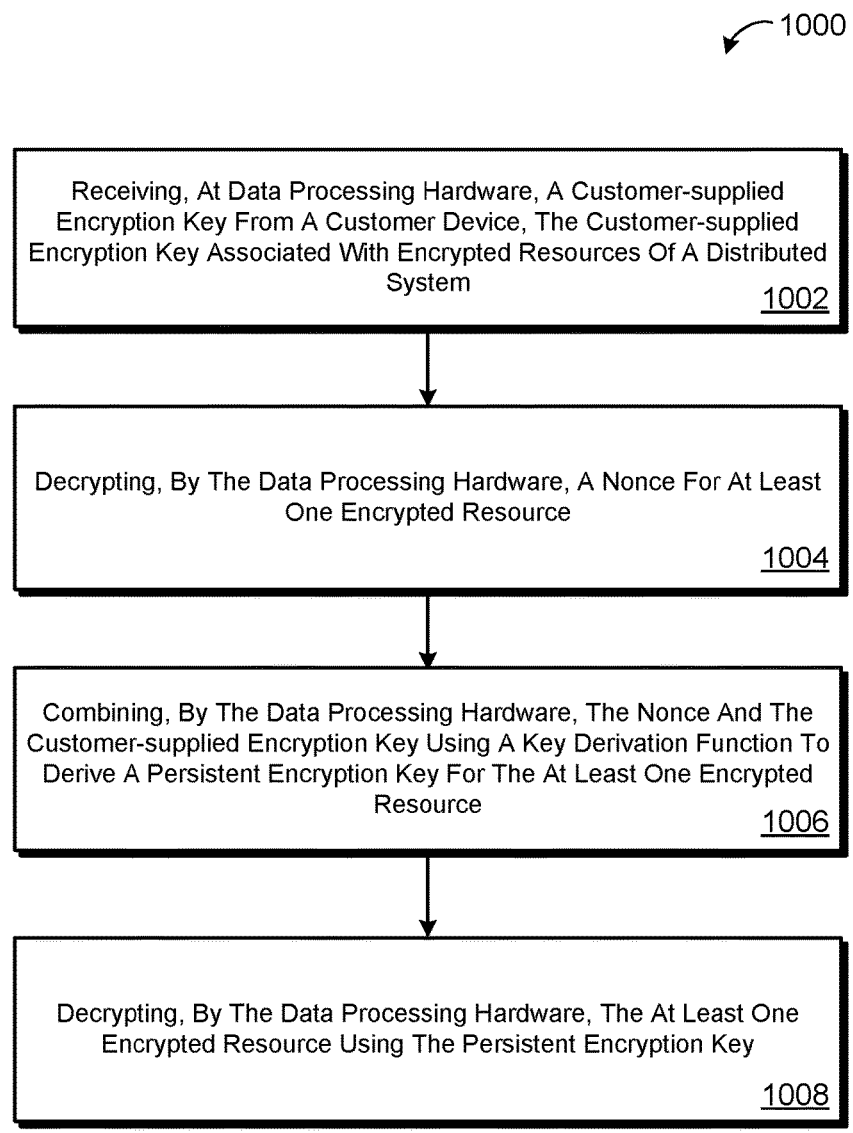
FIGS. 10 and 11 are schematic views of an exemplary arrangement of operations for retrieving a secured resource using a previously generated customer-supplied encryption key and a key derivation function.

Referring to FIG. 10, in some implementations, a method 1000 of operating a distributed storage system 100 includes at block 1002, receiving, at data processing hardware (e.g., a cryptographic manager 220 executing on a data processing hardware 222), a customer-supplied encryption key 122 from a customer device (e.g., a client 110). The customer-supplied encryption key 122 is associated with encrypted resources 250, 250a-n of a distributed system 100. At block 1004, the method 1000 includes decrypting, by the data processing hardware 222, a nonce 270 for at least one encrypted resource 250, 250a-n. At block 1006, the method 1000 includes combining, by the data processing hardware 222, the nonce 270 and the customer-supplied encryption key 122 using a key derivation function to derive a persistent encryption key 240, 240b, 240ba-bn for the at least one encrypted resource 250, 250a-n. At block 1008, the method 1000 includes decrypting, by the data processing hardware 222, the at least one encrypted resource 250, 250a-n using the derived persistent encryption key 240, 240b, 240ba-bn.

In some implementations, the method 1000 further includes identifying, by the data processing hardware 222, the nonce 270 using a key map 230 mapping nonces 270 for encrypted resources 250, 250a-n of the distributed system 100 to customer-supplied encryption keys 122. The key map 230 may include tuples, where each tuple includes a key identifier 232 identifying a customer-supplied encryption key 122, and a resource identifier 234 identifying an encrypted resource 250, 250a-n and the nonce 270 for the encrypted resource 250, 250a-n.

In some examples, decrypting the nonce 270, at block 1004, includes decrypting metadata 231 associated with the at least one encrypted resource 250, 250a-n, the metadata 231 including the nonce 270 for the at least one encrypted resource 250, 250a-n. After ceasing access of the at least one decrypted resource 250, 250a-n, the method 1000 includes destroying, by the data processing hardware 222, the customer-supplied encryption key 122 and the derived encryption key 240, 240b, 240ba-bn. In some examples, the nonce 270 includes a volatile cryptographic token 238. The method 1000 may include storing the customer-supplied encryption key 122 only on one or more volatile memory 224b hosts of the distributed system 100.

Figure 11:
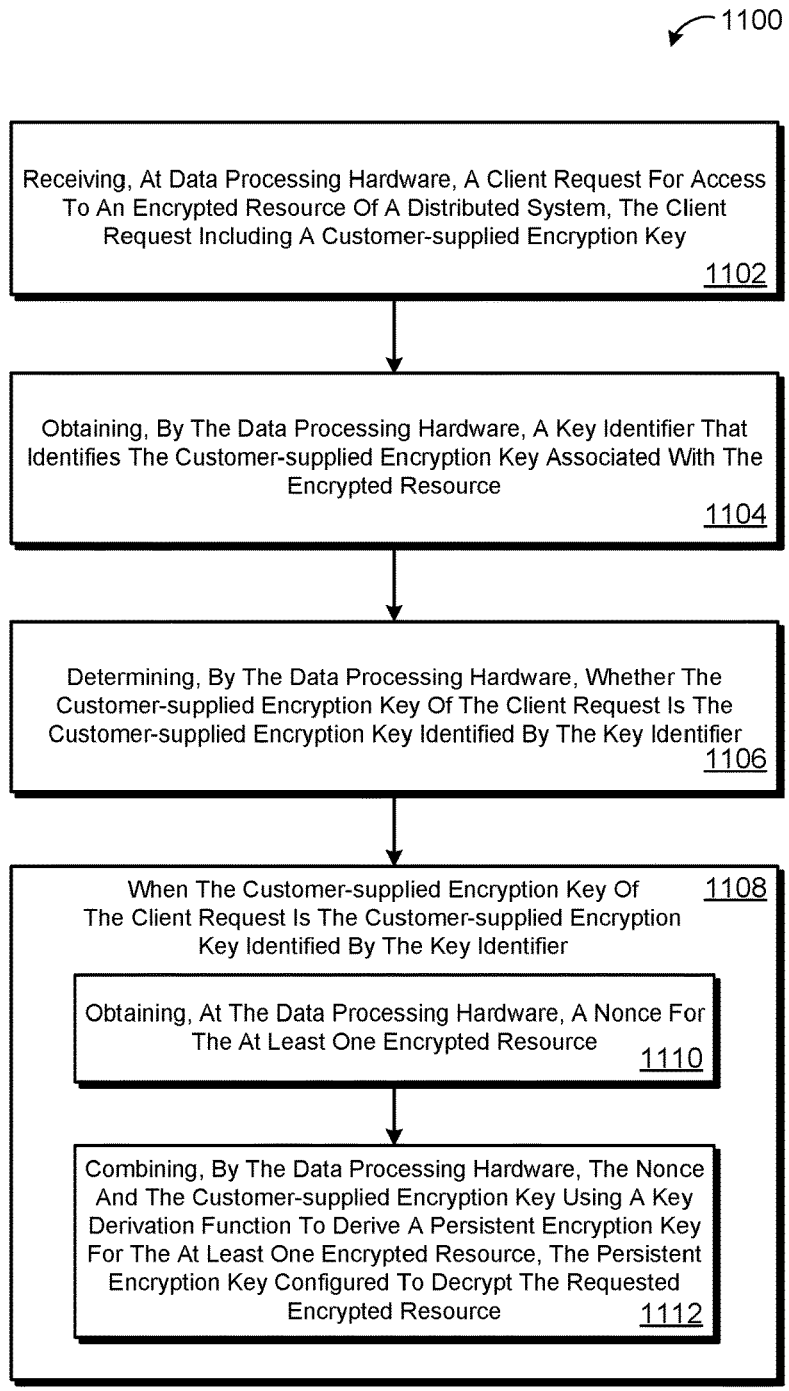

Referring to FIG. 11, in some implementations, a method 1100 of operating a distributed storage system 100 includes at block 1102, receiving, at data processing hardware (e.g., a cryptographic manager 220 executing on a data processing hardware 222), a client request 120 for access to an encrypted resource 250, 250a-n of a distributed system 100. The client request 120 includes a customer-supplied encryption key 122. At block 1104, the method 1100 includes obtaining, by the data processing hardware 222, a key identifier 232 that identifies the customer-supplied encryption key 122 associated with the encrypted resource 250, 250a-n. At block 1106, the method 1100 includes determining, by the data processing hardware 222, whether the customer-supplied encryption key 122 of the client request 120 is the customer-supplied encryption key 122 identified by the key identifier 232. At block 1108, when the customer-supplied encryption key 122 of the client request 120 is the customer-supplied encryption key 122 identified by the key identifier 232, at block 1110, the method 1100 includes obtaining, at the data processing hardware 222, a nonce 270 for the at least one encrypted resource 250, 250a-n. In addition, at block 1108, when the customer-supplied encryption key 122 of the client request 120 is the customer-supplied encryption key 122 identified by the key identifier 232, at block 1112, the method 1100 includes combining, by the data processing hardware 222, the nonce 270 and the customer-supplied encryption key 122 using a key derivation function to derive a persistent encryption key 240, 240b, 240ba-bn for the at least one encrypted resource 250, 250a-n. The derived persistent encryption key 240, 240b, 240ba-bn is configured to decrypt the requested encrypted resource 250, 250a-n.

In some implementations, the method 1100 further includes obtaining, by the data processing hardware 222, the key identifier 232 that identifies the customer-supplied encryption key 122 from metadata 231 associated with the encrypted resource 250, 250a-n. The method 1100 may further include obtaining, by the data processing hardware 222, the nonce 270 from the metadata 231 associated with the encrypted resource 250, 250a-n. Determining whether the customer-supplied encryption key 122 of the client request 120 is the customer-supplied encryption key 122 identified by the key identifier 232 at block 1106 includes determining whether a hash of the customer-supplied encryption key 122 of the client request 120 equals the key identifier 232.

In some examples, the method 1100 further includes identifying, by the data processing hardware 222, the requested encrypted resource 250, 250a-n using a key map 230 that maps encrypted resources 250, 250a-n of the distributed system 100 to customer-supplied encryption keys 122. The key map 230 may include tuples, where each tuple includes a key identifier 232 identifying a customer-supplied encryption key 122 and a resource identifier 234 identifying an encrypted resource 250, 250a-n of the distributed system 100. In some examples, the method 1100 further includes obtaining, by the data processing hardware 222, the key identifier 232 that identifies the customer-supplied encryption key 122 from the key map 230. The key map 230 may be stored on one or more non-volatile memory hosts 224a of the distributed system 100, and the customer-supplied encryption key 122 of the client request 120 is only stored on one or more volatile memory hosts 224b of the distributed system 100.

In some implementations, the method 1100 includes decrypting, by the data processing hardware 222, the requested encrypted resource 250, 250a-n using the derived persistent encryption key 240, 240b, 240ba-bn. The method 1100 may also include deleting the derived persistent encryption key 240, 240b, 240ba-bn and the customer-supplied encryption key 122 after receiving an event notification indicating a termination of access to the decrypted resource 250, 250a-n. In some examples, the method 1100 includes storing the derived persistent encryption key 240, 240b, 240ba-bn only on one or more volatile memory hosts 224b of the distributed system 100.

Figure 12:
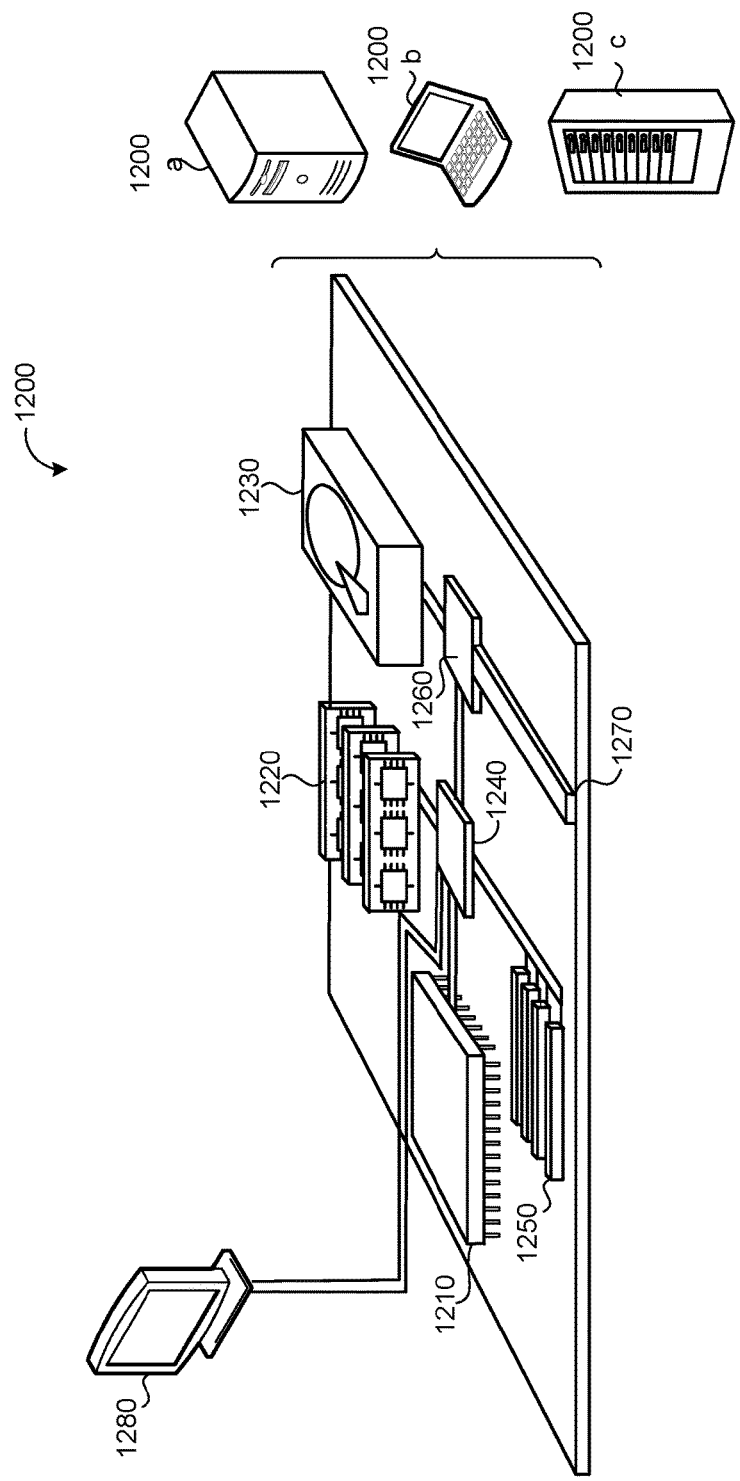
FIG. 12 is a schematic view of an exemplary arrangement of operations for reconstructing data in a stripe.

FIG. 12 is schematic view of an example computing device 1200 that may be used to implement the systems and methods described in this document. The computing device 1200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1200 includes a processor 1210, memory 1220, a storage device 1230, a high-speed interface/controller 1240 connecting to the memory 1220 and high-speed expansion ports 1250, and a low speed interface/controller 1260 connecting to low speed bus 1270 and storage device 1230. Each of the components 1210, 1220, 1230, 1240, 1250, and 1260, are interconnected using various busses, and may be mounted on a common motherboard or in other manners as appropriate. The processor 1210 can process instructions for execution within the computing device 1200, including instructions stored in the memory 1220 or on the storage device 1230 to display graphical information for a graphical user interface (GUI) on an external input/output device, such as display 1280 coupled to high speed interface 1240. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1220 stores information non-transitorily within the computing device 1200. The memory 1220 may be a computer-readable medium, a volatile memory unit(s), or non-volatile memory unit(s). The non-transitory memory 1220 may be physical devices used to store programs (e.g., sequences of instructions) or data (e.g., program state information) on a temporary or permanent basis for use by the computing device 1200. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1230 is capable of providing mass storage for the computing device 1200. In some implementations, the storage device 1230 is a computer-readable medium. In various different implementations, the storage device 1230 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1220, the storage device 1230, or memory on processor 1210.

The high speed controller 1240 manages bandwidth-intensive operations for the computing device 1200, while the low speed controller 1260 manages lower bandwidth-intensive operations. Such allocation of duties is exemplary only. In some implementations, the high-speed controller 1240 is coupled to the memory 1220, the display 1280 (e.g., through a graphics processor or accelerator), and to the high-speed expansion ports 1250, which may accept various expansion cards (not shown). In some implementations, the low-speed controller 1260 is coupled to the storage device 1230 and low-speed expansion port 1270. The low-speed expansion port 1270, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1200a or multiple times in a group of such servers 1200a, as a laptop computer 1200b, or as part of a rack server system 1200c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, at data processing hardware of a distributed system, a client request from a customer device for access to a requested encrypted resource of the distributed system, the client request including a customer-supplied encryption key associated with wrapped persistent encryption keys for encrypted resources of the distributed system, the wrapped persistent encryption keys stored on one or more non-volatile memory hosts of the distributed system;
   storing, by the data processing hardware, the customer-supplied encryption key of the received client request on one or more volatile memory hosts of the distributed system;
   unwrapping, by the data processing hardware, a wrapped persistent encryption key corresponding to the requested encrypted resource using the customer-supplied encryption key, the unwrapped persistent encryption key configured to decrypt the requested encrypted resource;
   decrypting, by the data processing hardware, the requested encrypted resource using the corresponding unwrapped persistent encryption key;
   sending the decrypted resource from the data processing hardware to the customer device; and
   after ceasing access of the decrypted resource, destroying, by the data processing hardware, the customer-supplied encryption key from the one or more volatile memory hosts of the distributed system.

2. The method of claim 1, further comprising identifying, by the data processing hardware, the wrapped persistent encryption key using a key map mapping the wrapped persistent encryption keys for the encrypted resources of the distributed system to customer-supplied encryption keys.

3. The method of claim 1, further comprising obtaining metadata associated with the requested encrypted resource using a resource identifier, the metadata including the wrapped persistent encryption key for the requested encrypted resource.

4. The method of claim 1, wherein the requested encrypted resource comprises a secure container of a secure container system.

5. The method of claim 1, further comprising deleting the unwrapped persistent encryption key after receiving an event notification indicating a termination of access to the decrypted resource.

6. The method of claim 2, wherein the key map comprises tuples, each tuple comprising:
   a key identifier identifying a customer-supplied encryption key; and
   a resource identifier identifying an encrypted resource and the wrapped persistent encryption key for the encrypted resource.

7. The method of claim 2, wherein the key map is stored on the one or more non-volatile memory hosts of the distributed system.

8. The method of claim 3, further comprising:
   determining, by the data processing hardware, whether the customer-supplied encryption key of the client request is the customer-supplied encryption key identified by a key identifier obtained from the metadata associated with the requested encrypted resource; and when the customer-supplied encryption key of the client request is the customer-supplied encryption key identified by the key identifier, unwrapping, by the data processing hardware, the wrapped persistent encryption key for the requested encrypted resource using the customer-supplied encryption key of the client request.

9. The method of claim 8, wherein determining whether the customer-supplied encryption key of the client request is the customer-supplied encryption key identified by the key identifier comprises determining whether a hash of the customer-supplied encryption key of the client request equals the key identifier.

10. A method comprising:
receiving, at data processing hardware, a client request from a customer device for access to an encrypted resource of a distributed system, the client request including a customer-supplied encryption key;
storing, by the data processing hardware, the customer-supplied encryption key of the received client request only on one or more volatile memory hosts of the distributed system;
obtaining, by the data processing hardware, a key identifier that identifies the customer-supplied encryption key associated with the encrypted resource;
determining, by the data processing hardware, whether the customer-supplied encryption key of the client request is the customer-supplied encryption key identified by the key identifier by determining whether a hash of the customer-supplied encryption key of the client request equals the key identifier;
when the customer-supplied encryption key of the client request is the customer-supplied encryption key identified by the key identifier, unwrapping, by the data processing hardware, a wrapped persistent encryption key associated with the requested encrypted resource using the customer-supplied encryption key, the unwrapped persistent encryption key configured to decrypt the requested encrypted resource;
decrypting, by the data processing hardware, the requested encrypted resource using the unwrapped persistent encryption key; and
sending the decrypted resource from the data processing hardware to the customer device.

11. The method of claim 10, further comprising obtaining, by the data processing hardware, the key identifier that identifies the customer-supplied encryption key from metadata associated with the encrypted resource.

12. The method of claim 10, further comprising identifying, by the data processing hardware, the wrapped persistent encryption key using a key map mapping wrapped persistent encryption keys for encrypted resources of the distributed system to customer-supplied encryption keys.

13. The method of claim 10, further comprising deleting the unwrapped persistent encryption key and the customer-supplied encryption key after receiving an event notification indicating a termination of access to the decrypted resource.

14. The method of claim 10, further comprising storing the unwrapped persistent encryption key only on the one or more volatile memory hosts of the distributed system.

15. The method of claim 10, wherein the requested encrypted resource comprises a secure container of a secure container system.

16. The method of claim 12, wherein the key map comprises tuples, each tuple comprising:

a key identifier identifying a customer-supplied encryption key; and
a resource identifier identifying an encrypted resource and the wrapped persistent encryption key for the encrypted resource.

17. The method of claim 12, wherein the key map is stored on one or more non-volatile memory hosts of the distributed system.

18. The method of claim 16, further comprising obtaining, by the data processing hardware, the key identifier that identifies the customer-supplied encryption key from the key map.

19. A method comprising:
receiving, at data processing hardware, a key map mapping persistent encryption keys for encrypted resources of a distributed system, the persistent encryption keys stored wrapped in a wrapper on one or more non-volatile memory hosts of the distributed system;
storing, by the data processing hardware, the key map on the one or more non-volatile memory hosts of the distributed system;
receiving, at the data processing hardware, a client request from a customer device for access to a requested encrypted resource of the distributed system, the client request including a customer-supplied encryption key, the customer-supplied encryption key associated with the wrapped persistent encryption keys for the encrypted resources;
storing, by the data processing hardware, the customer-supplied encryption key of the received client request only on one or more volatile memory hosts of the distributed system;
receiving, at the data processing hardware, a volatile cryptographic token from the customer device;
combining, by the data processing hardware, the volatile cryptographic token and the customer-supplied encryption key using a key derivation function to derive a persistent encryption key;
unwrapping, by the data processing hardware, a wrapped persistent encryption key corresponding to the requested encrypted resource using the derived persistent encryption key, the unwrapped persistent encryption key configured to decrypt the requested encrypted resource;
decrypting, by the data processing hardware, the requested encrypted resource using the corresponding unwrapped persistent encryption key; and
sending the decrypted resource from the data processing hardware to the customer device.

20. The method of claim 19, further comprising accessing, by the data processing hardware, at least one encrypted resource using at least one unwrapped persistent encryption key.

21. The method of claim 19, further comprising deleting the volatile cryptographic token after unwrapping the wrapper.

22. The method of claim 19, further comprising deleting the derived persistent encryption key after receiving an event notification indicating a termination of access to the decrypted resource.

23. The method of claim 19, further comprising:
creating, by the data processing hardware, the persistent encryption keys for the encrypted resources of the distributed system;
enumerating, by the data processing hardware, the persistent encryption keys; and wrapping, by the data processing hardware, the persistent encryption keys.

24. The method of claim 19, wherein the encrypted resources comprise encrypted data stored on the one or more non-volatile memory hosts of the distributed system.

25. The method of claim 20, further comprising storing the unwrapped persistent encryption keys only on the one or more volatile memory hosts of the distributed system.

26. The method of claim 25, further comprising deleting the unwrapped persistent encryption keys from the one or more volatile memory hosts of the distributed system after receiving an event notification indicating a termination of access to the at least one encrypted resources.

* * * * *